United States Patent [19]
Beatson et al.

[11] Patent Number: 5,892,824
[45] Date of Patent: Apr. 6, 1999

[54] SIGNATURE CAPTURE/VERIFICATION SYSTEMS AND METHODS

[75] Inventors: Rodney Beatson, Ellicott City; Mark A. Kelty, Catonsville; Marc J. Riley, Pasadena, all of Md.

[73] Assignee: International Verifact Inc., Roswell, Ga.

[21] Appl. No.: 585,591

[22] Filed: Jan. 12, 1996

[51] Int. Cl.$^6$ .................................................. H04L 9/00
[52] U.S. Cl. ............................ 380/25; 380/24; 382/119
[58] Field of Search ................... 380/23–25; 340/825.34; 382/119

[56] References Cited

U.S. PATENT DOCUMENTS

| | | |
|---|---|---|
| 3,624,293 | 11/1971 | Baxter et al. . |
| 3,873,770 | 3/1975 | Ioannou . |
| 4,028,674 | 6/1977 | Chuang . |
| 4,240,065 | 12/1980 | Howbrook . |
| 4,308,522 | 12/1981 | Paganini et al. . |
| 4,672,182 | 6/1987 | Hirokawa ................... 380/23 |
| 4,771,460 | 9/1988 | Tamada et al. ............. 380/23 |
| 4,803,351 | 2/1989 | Shigenga .................... 380/23 |
| 5,048,085 | 9/1991 | Abraham et al. ........... 380/25 |
| 5,054,088 | 10/1991 | Gunderson et al. ........ 340/825.34 |
| 5,115,107 | 5/1992 | Crooks et al. . |
| 5,140,107 | 8/1992 | Crooks et al. . |
| 5,150,420 | 9/1992 | Haraguchi ................... 382/119 |
| 5,191,175 | 3/1993 | Protheroe et al. . |
| 5,195,133 | 3/1993 | Kapp et al. ................. 380/24 |
| 5,223,677 | 6/1993 | Kapp et al. . |
| 5,225,636 | 7/1993 | Protheroe . |
| 5,233,547 | 8/1993 | Kapp et al. . |
| 5,245,139 | 9/1993 | Protheroe et al. . |
| 5,272,469 | 12/1993 | Memarzadeh . |
| 5,283,557 | 2/1994 | Memarzadeh . |
| 5,297,202 | 3/1994 | Kapp et al. ................. 380/23 |
| 5,335,230 | 8/1994 | Crooks et al. . |
| 5,371,117 | 12/1994 | Parish et al. . |
| 5,373,117 | 12/1994 | Crooks . |
| 5,387,765 | 2/1995 | Crooks . |
| 5,414,441 | 5/1995 | Memarzadeh et al. . |
| 5,434,928 | 7/1995 | Wagner et al. ............. 382/119 |
| 5,479,280 | 12/1995 | Kazurov et al. . |
| 5,539,159 | 7/1996 | Protheroe et al. . |
| 5,563,381 | 10/1996 | Crooks et al. . |
| 5,604,802 | 2/1997 | Holloway ................... 380/24 |

FOREIGN PATENT DOCUMENTS

| | | |
|---|---|---|
| 0006419 | 9/1980 | European Pat. Off. . |
| 2909899 | 9/1980 | Germany . |
| 2080004 | 7/1980 | United Kingdom . |

OTHER PUBLICATIONS

Carlson, Barton K., "Signature Capture Goes Electronic," *RIS NEWS*, Jan. 1993.

Digital Signatures, Inc. brochure, "SIGN/ON ST–2 Signature Capture Pad," 5 pages., (1992).

David J. Harrison, "New technology charges up credit card industry," *Baltimore Business Journal*, Feb. 7, 1992, pp. 1 and 18.

Jon Morgan, "High–tech check on 'John Hancock'," *Evening Sun*, Dec. 26, 1991, pp. D1 and D6.

*Primary Examiner*—Salvatore Cangialosi
*Attorney, Agent, or Firm*—Nixon & Vanderhye P. C.

[57] ABSTRACT

A signature device for capture or capture and verification includes a variety of advantageous features including, for example, an ability to work in conjunction with an IC card; an improved angle correction technique; an improved technique for adapting to biometric signature changes; and many other new improvements.

38 Claims, 18 Drawing Sheets

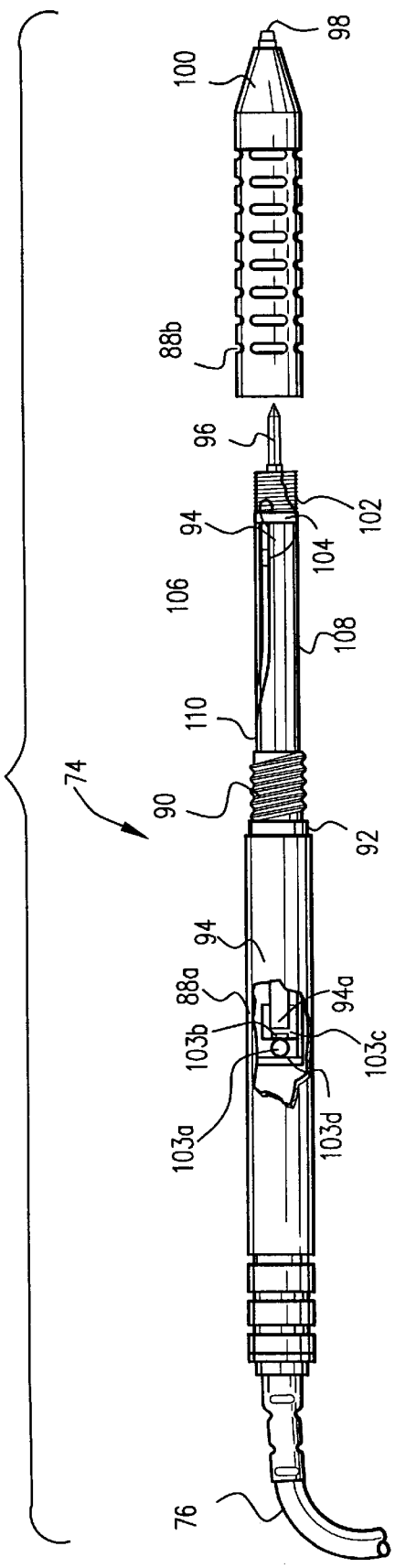
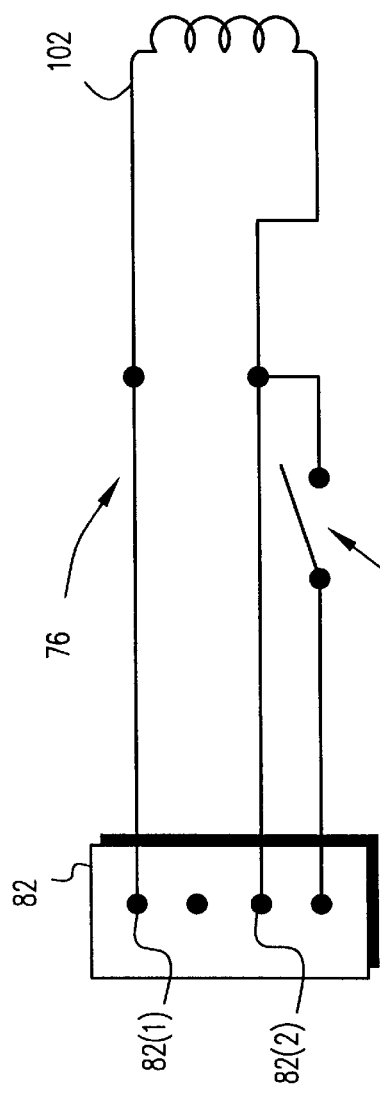
Fig. 4A
Fig. 4B

SIGNATURE CAPTURE/VERIFICATION SYSTEMS AND METHODS

FIELD OF THE INVENTION(S)

This invention relates to electronic signature devices, and more particularly to devices and techniques for capturing and/or verifying handwritten signatures. Still more particularly, the present invention relates to systems and methods for handling and processing handwritten signatures electronically in real-time in the field such as at the point of transaction.

BACKGROUND AND SUMMARY OF THE INVENTION

If the customer is not paying cash for a transaction but instead is charging the transaction cost to a credit card or bank account, a retailer typically may require the customer to sign a charge slip as evidence that the customer is who he says he is and actually purchased the goods or services. Retailers commonly save and file these signed paper receipts, and forward them upon request to a credit card company or other financial institution as evidence of the transaction. In addition, some retailers attempt to "authenticate" the customer's signature at time of transaction by visually comparing it with a presumed authentic signature on the back of the credit card and/or on a photo ID such as a driver's license. Thus, the store clerk makes a quick visual comparison between (a) a presumed-to-be-authentic signature presented by the customer, and (b) the signature the customer created on a paper charge slip in the presence of the store clerk.

This "authentication" technique may sometimes be successful in detecting amateur thieves, but has severe limitations that make it totally ineffective against any serious and/or intelligent thief. For example, a thief can easily avoid detection by simply practicing the signature to be forged beforehand—since store clerks typically are not skilled in the art of handwriting comparison. Skillful thieves can distract the store clerk with small talk or compliments—thereby effectively destroying the effectiveness of any visual handwriting comparisons. Moreover, many store clerks (especially those faced with a long line of anxiously waiting customers) may not be willing to take the time to make a careful visual signature comparison. Still further, a thief can destroy the reliability of the entire visual inspection handwriting authentication process by presenting his own handwritten signature of an alias name as the presumed-to-be-valid signature for comparison purposes. People sometimes do not sign the backs of their credit cards as they are supposed to, and a thief can easily write the credit card owner's name in the thief's own handwriting on the back of an unsigned card—which the thief can of course easily reproduce on demand on a paper charge slip. Professional thieves sometimes also forge photo IDs—completely bypassing efforts to detect fraudulent transactions based on visual handwriting comparison. In addition, store clerks very seldom study the hand-written signature on the back of the card and there is thus little chance of detecting the use of a lost or stolen card.

An alternative to using a signature for establishing authorization to conduct a transaction is to have the customer input his or her PIN (personal identification number) into a transaction terminal. This PIN technique has recently become quite popular for point-of-sale transactions involving ATM (automatic teller machine) bank cards. However, PIN-based transactions suffer from the following problems as compared to requiring a signature:

1) If the PIN is known by an imposter, the transaction is compromised with 100% certainty. If the signature is known by the imposter, however, there is a lower probability of success so there is a significant deterrent to the would be imposter attempting to forge the signature.
2) The PIN may be forgotten by the customer. The signature is never forgotten.
3) The PIN provides no hard audit trail back to the actual customer. With a signature, the audit trail is in the form of a reproducible signature image.
4) Requiring a signature provides a convenient (albeit not always 100% reliable) human comparison of submitted and authentic signatures. The PIN system offers no comparable capability.

The handling of signed paper receipts as evidence of a transaction has also become a significant problem. For some time now retailers and the acquiring banks have been concerned with the cost in time and effort associated with dealing with the "request for copy" process. The process starts when a customer, not recognizing an item on his monthly credit card statement, calls his issuer to query the charge. The credit card company rules define the further procedures as follows:

(a) the customer account is credited temporarily pending investigation;
(b) the acquiring bank (or merchant bank) is debited pending investigation;
(c) the retailer is asked by the acquiring bank to produce a copy of the sales slip with the customer's signature on it (about 30% of these slips are not produced by the retailer);
(d) if the retailer cannot produce a sales slip with a valid or legible signature he loses the revenue from the transaction. If the signature is fraudulent, either the card issuer or the retailer stands the loss;
(e) if the retailer produces a valid transaction record, the charge is reinstated in the customer's account and the acquiring bank is once more credited with the transaction value.

About 0.4% of all credit card transactions are challenged in this manner. With the paper-based "signature on file" process, each investigation can drag on for about four weeks before a resolution is reached. The acquiring bank is out of pocket during this period to the extent of the value of the transaction and expends valuable time attempting to resolve the dispute. Recent rules have been introduced by Visa and MasterCard which cause the issuers to provide a strong financial incentive to the acquirers to respond quickly to retrieval requests.

The retailer, in order to service the request for copy efficiently, often installs expensive microfilm systems and is asked to keep copies for up to three years. To service each request someone must physically search out the copy and regenerate an image of the transaction. If the retailer does not install such equipment it is estimated that on an average of up to 30% of the copies cannot be found and the retailer loses the sale revenue under these circumstances. In order to prepare for requests for copy and to reconcile the credit card transactions with the register audit tape, all systems generate an extra copy of the transaction details which are reconciled and batched for processing each day. All this effort is quite costly to the retailer.

Electronic Signature Capture/Verification Systems

Electronic signature terminals, which can help solve some of these problems, are in use today at over 70,000 points of service in the U.S. Applications include credit card processing (the major application), drivers license issuance, insurance applications and car rental agreements. There are a number of other applications involving electronic signature verification (with and without permanent capture) which provide user authentication at the point of transaction. These terminals are capturing anything up to 500 signatures per day with an average of about 100 per terminal per day. This means that there may be about 7,000,000 signatures per day (or about 2,500,000,000 per year) captured and stored electronically in the U.S. today.

Typically when using such devices, a receipt or application form is placed on the signature terminal so that the signature line is presented to the customer. A special attached pen with a ball point ink cartridge is provided which allows the signature to be captured electronically at the same time it is written in ink. Thereafter the original signed receipt is given to the customer who leaves with the only piece of paper in the system. Everything else has been captured electronically in a simple efficient format that can be electronically stored with the associated electronic document data. This allows for later communication to a corporate host computer or acquiring bank and easy reproduction on a laser printer.

Some of these signature terminals include the capability to verify the submitted signature at the point of service. However, currently the driving force behind the largest application of signature capture devices is the retailers' desire to eliminate the mountains of paper which they currently store to satisfy queried credit card transactions and to minimize the probability of "losing" the receipts (and hence the transaction revenues) from these queried transactions. Retailers installing the terminals have typically generated paybacks of less than one year from the savings associated with this type of investment.

Retail Payback from Signature Capture—an Example

Consider a retailer with the following profile:
1) $1.0 Billion in credit card transactions
2) Average ticket value $200
3) 3000 ECR's Document Handling Savings Assume the store prints, reconciles and files 90% of the 5 million credit card receipts.
At one minute per document @ $8.00 per hour
Savings=$600,000/year
Chargeback Savings
Assume 0.4% of all filed receipts are requested.
Assume 15% of those requested are not found
Savings=$540,000/year
Assume that 20% of found retrievals are charged due to signature. This is equivalent to another 3060 chargebacks @ $200.00 per chargeback
Savings=$612,000/year System Costs Assume the devices are $250 each.
Assume there is a further one-time $100,000 software/magnetic media charge.
Total system costs=$850,000

Payback Period

850*12/(600+540+612)→5.8 months

PAYBACK IN LESS THAN 6 MONTHS—ignoring retrieval labor.

This example demonstrates the powerful economic benefits which the adoption of electronic signature technology can deliver to the retailer. These benefits stem from:

(a) eliminating the chargebacks attributable to lost or illegible transaction copies;

(b) virtually eliminating the administrative effort associated with filing, retrieval and the chargeback process;

(c) streamlining the payment process at the register by eliminating the duplicate copy of the credit card slip and automating the reconciliation process;

(d) vastly improving the efficiency of satisfying the "request for copy" process in the acquiring merchant banks so that close to 100% of these requests will be satisfied within days rather than 70% of the requests satisfied in weeks. In addition, the acquirer is compensated handsomely by the issuer for satisfying the retrieval requests in a timely manner;

(e) significantly reducing credit card fraud (which, today stands at over $1 billion) using the electronic signature verification feature (some of these signature terminals which generate such an attractive return to the retailer contain the capability, turned on by software at the host device or register, to verify the submitted signature at point of service).

Problems With Prior Signature Capture/Verification Devices

Signature capture/verification devices have been made and marketed for several years by several different companies including, for example, Thomas De La Rue of Reston Va.; Signify Inc. and Autosig Systems, Inc. of Irving Tex.; A. I. Transactions Security (UK); Digital Signatures, Inc. of Columbia Md.; AT&T Global Information Solutions Inc. (formerly NCR) of Dayton, Ohio; and others. Despite extensive past efforts in designing and developing signature capture/verification systems, further improvements are possible in view of persisent problems with automatic signature verification at the transaction point.

One persistent problem relates to reject rates of signature verification systems. The signature is a behavioral biometric (as opposed to a physical biometric, such as a fingerprint) and as such there is a possibility that the customer will have an "off day" (or the customer's signature has changed over time) so that an authentic signature will fail the biometric test. It is highly desirable to minimize the frequency of such rejections. Of course, there is no need to insist on totally impractical accuracy rates to "minimize customer insults." In such a reject situation, uniquely for any biometric system and in contrast to a fingerprint system for example, the sales associate can very easily and conveniently exercise human judgment (as he is supposed to do today but seldom does because the transaction process does not facilitate it) to determine the validity of the signature—since the decision on identity is a function of the total information available. Nevertheless, the occurrence of a verification rejection is always a difficult decision for the retailer and is potentially quite embarrassing for the customer. In the event of a reject, the customer would hopefully be able to present evidence showing that he or she is authorized to use the card (e.g., someone using his or her spouse's card) as evidenced for example by a signed statement to that effect agreeing with the card holder's authentic file signature currently being displayed on the terminal. In the event that the signatures do not match up, the sales associate can ask for further evidence if ID before coming to a decision. The final decision on identity will always be that of the retailer as it is today and the signature system provides a reliable guide to and a secure audit trail of the ID decision.

Test results on an example signature verification device have indicated a 97.9% authentic acceptance rate coupled with a 99.4% impostor rejection rate based on a relatively high security setting. In a retail or banking environment, the setting would be somewhat relaxed but even at this level, with the ability to supplement the decision with human judgment, the authentic acceptance rate may be acceptable. Nevertheless, there is a constant and consistent goal and desirability of minimizing embarrassing rejects.

Another significant problem with signature verification relates to the source of "good" signatures for comparision purposes. Unlike the situation with credit card accounts and checks, there is currently no nationwide database a retailer can call to obtain a known authentic signature of a customer for comparison purposes.

One way to solve this problem is to further enhance electronic signature capture transactions through use of a "smart" IC card. A signature device makes a very convenient host for a smart card reader which enables the signature image and verification template (different from the signature image) to reside on a smart card. The customer can carry this IC card and present it to the retailer at the time of transaction. The IC card may even include a photo or other identifying means to provide an additional form of identification.

The use of a smart or IC card provides off-line user authentication and a hard audit trail—ideal for loyalty programs and medical/insurance card applications. Consider how a retail transaction may be conducted at the point of service with the use of a signature terminal with integrated smart card reader:

1) The transaction items are rung up at the register and the customer tenders a smart card which could be used to trigger a charge transaction to the retailers loyalty card, to a bank card or to a travel related proprietary card. Alternatively it could be tendered as a check guarantee card. In any case, the card is inserted into the slot of the smart card reader integrated into the signature terminal which is connected to the register and the customer selects the appropriate transaction type.

2) The signature image of the authentic cardholder which was written at personalization (stored on the card in ROM in less than 500 bytes) is passed to the register which displays it prominently on the screen.

3) The verification template of the cardholder (stored in EEPROM in about 50 bytes with an embedded message authentication code) created at personalization, is read from the smart card and passed to the signature terminal which tests the template for authenticity and then prompts for a signature. The signature is captured electronically as the receipt is signed by the customer and is passed to the register for display and (human) comparison with the authentic image already displayed.

4) In parallel with this process, the signature terminal carries out the signature verification analysis and passes back to the register the result of the analysis (pass or fail and/or a mis-match score). This is the third significant item of information that the sales associate requires for validation of identity. The sales associate will now use this information to determine whether further identity checks are required. The whole process has taken place while the signature is being submitted—part of the normal transaction process—and the system forces the comparison decision to take place by requiring the sales associate to ACCEPT or DECLINE the transaction before it is closed out.

5) Only if the signature is accepted by the signature terminal, irrespective of the sales associate's decision on the transaction, is the verification template (with a new authentication code embedded within it) re-written to the smart card. The calculation uses the previous template and the last good signature as the basis for the new template. This allows the template to mold itself to the user over time and a constantly changing authentication code protects a verification template, changed on the card by some third party, from being used at the next transaction.

In addition to providing these advantageous solutions to long-standing problems as discussed above, the present invention has the following additional advantageous features:

A digitizer located beneath and spaced from the writing surface together with circuitry to locate the position of a stylus moving on the surface or on a record member located on the surface.

A means of locating the record member on the signature tablet such that the plane of the record member coincides with that of the x,y plane of the digitizer during the writing of the signature.

A means of enabling said record member to be inserted easily into position from the top or from the side and to avoid the member moving on the surface when the signature is written with the stylus.

A stylus coupled electrically or electro-magnetically to the digitizer with or without a replaceable ink refill.

An integrated IC (smart) card connector controlled by the signature tablet processor such that data including an electronic signature image may be read from and/or written to an intelligent or memory based IC card.

A means of two-way communication with a host device so that a signature captured electronically may be compared with that stored on the smart card or at the host device and may be communicated to the host together with the result of the signature comparison for display, storage, onward transmission or hard copy reproduction.

A method of comparing a submitted signature against a signature verification template supplied from the host or from a smart card based upon the extraction of a number of mathematically defined features.

A method of authenticating the verification template against tampering by means of writing a template authentication code into the signature verification template at creation and update and by checking the authentication code whenever the template is communicated to the tablet.

A method of updating the verification template after each accepted signature so that the template molds itself to the author if the signature changes gradually over time.

A means of enrolling new authors through checking for compatibility of a minimum of three initial signatures.

A means of automatically detecting the host communications protocol and adapting the communications port accordingly.

A means of operating the signature tablet wirelessly allowing it to be moved easily from one location to another.

A means of determining the angle of submission of the signature and correcting for said angle before signature comparison.

A special means of calculating the angle of submission which minimizes the sum of squared errors perpendicular to the line of regression rather than the sum of vertical or horizontal squared errors.

A special means of compressing and representing the captured signature to minimize the number of points defining the signature so that points almost on a straight line are eliminated and each x,y coordinate pair, or the differences between successive coordinate pairs, is represented in two eight bit binary numbers or in three bytes or more of ASCII code.

A means of encrypting the captured signature using a transaction based number communicated to the tablet from the host prior to communicating the signature back to the host.

A means of decrypting the signature when supplied with the encrypted signature and the original transaction based number from an attached host.

A signature tablet with these features containing a PIN pad allowing PIN based cardholder authentication to take place supporting DUKPT (derived unique key per transaction) and Master Session key management.

An electronic signature tablet containing these features with an integrated LCD display allowing the electronically captured signature to be displayed on said LCD.

A means of authenticating the validity of an IC card by utilizing public key encryption, using the IC card's public key to decrypt a message encrypted by the private key from the card.

Customization parameters stored in non-volatile fashion characterizing the operation of signature capture, signature verification, signature compression, and signature encryption.

BRIEF DESCRIPTION OF THE DRAWINGS

These and other features and advantages provided by the present invention will be better and more completely understood by referring to the following detailed description in connection with the drawings, of which:

FIG. 4a shows an exploded view of an example signature device pen;

FIG. 4b shows an example electrical diagram of the FIG. 4a pen;

DETAILED DESCRIPTION OF PRESENTLY PREFERRED EXAMPLE EMBODIMENTS

Figure 1:
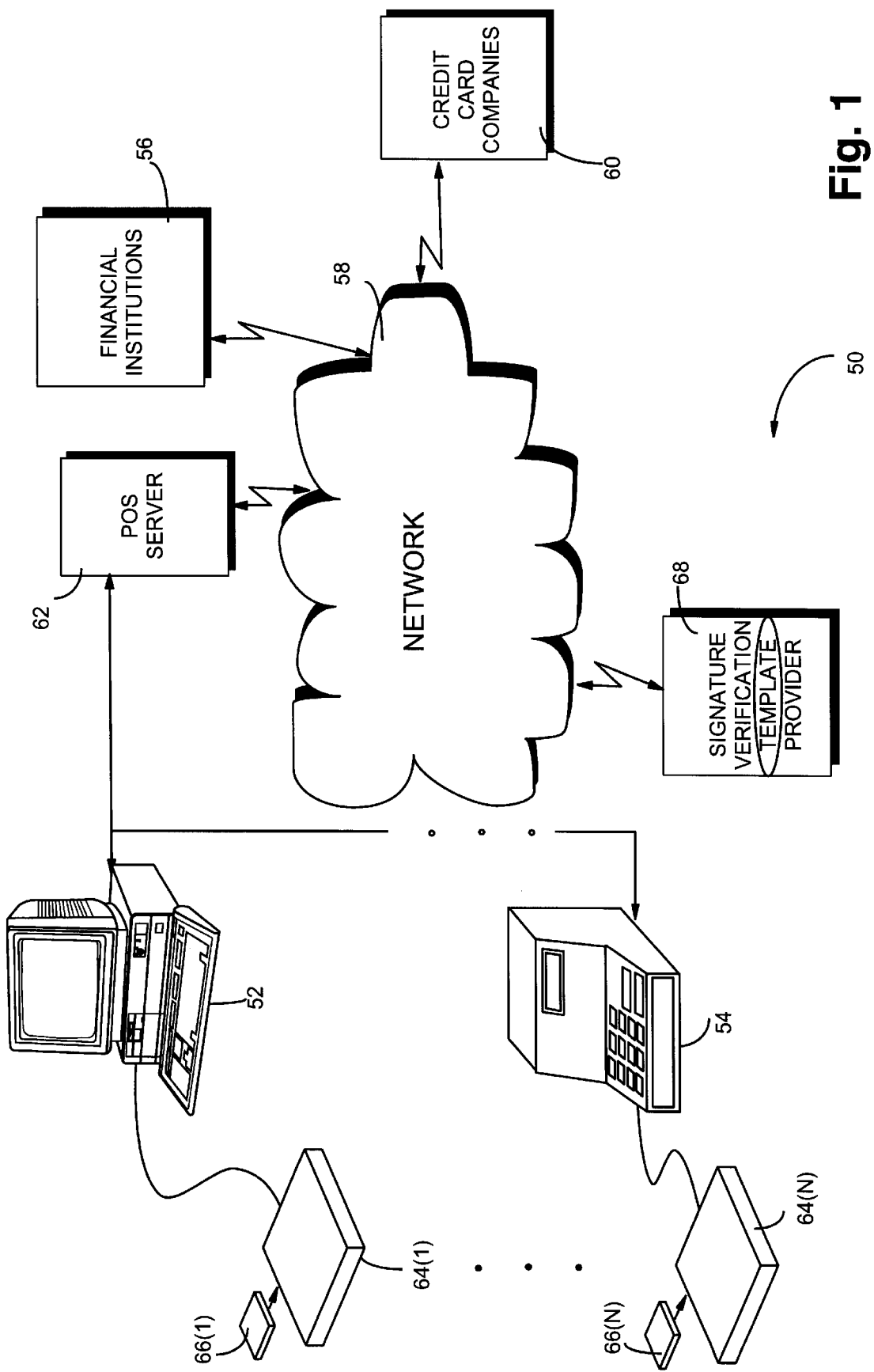
FIG. 1 shows an overall point of transaction (POS) transaction system capable of real-time electronic signature processing.

FIG. 1 shows, by way of example, an overall transaction system 50 including real-time signature processing capabilities. In this example, electronic transaction devices such as personal computers 52 and electronic cash registers 54 are installed at the point of transaction (e.g., a retail store that sells goods and/or services to members of the public).

These electronic transaction devices 52, 54 have conventional designs and operate electronically under control of conventional hardware and/or software to perform common electronic transaction functions. As one specific example, electronic transaction devices 52 may automatically add the prices of multiple items to provide a subtotal, automatically calculate and add in sales tax, automatically apply discounts, automatically display totals and other information on an integral display, automatically print paper receipts or other record members for signature by customers, automatically debit a bank account at a financial institution 56 via a financial transaction network 58, automatically accept credit card and/or checking account numbers, automatically verify the authenticity of the credit card and/or checking account number by contacting and receiving real-time authorization from a credit card company 60 or the like, automatically download transaction data to a local or remote retail data processing server 62, etc.

In the example point of transaction system 50 shown in FIG. 1, each of electronic transaction devices 52, 54 has a signature device ("tablet") 64 connected to it. Typically, the store clerk controls electronic transaction device 52, 54 to print out a paper receipt for signature by the customer as a means of verifying the identity of the customer and evidencing a non-cash transaction. In this example, the store clerk places the paper receipt on signature device 64 and asks the customer to sign the receipt. As the customer signs the receipt, the signature device 64 captures an electronic image of the customer's handwritten signature and stores it in an internal memory.

Because the signature has now been captured electronically, the sales clerk does not need to retain a copy of the paper receipt signed by the customer. Instead, signature device 64 may automatically transmit a file containing the electronic image of the customer's signature to the electronic transaction device 52, which may in turn store the file locally on transaction server 62 and/or transmit it via network 58 to some other computer for storage and later retrieval. This electronic signature capture technique thus increases reliability and saves time and effort by dispensing with the need to keep track of, handle and transport signed paper receipts.

In accordance with another aspect provided by the present invention, signature device 64 may also verify the authenticity of the customer's signature automatically and electronically in real-time at the point of transaction. For example, before signing the paper receipt, the store clerk may ask the customer to present an electronic IC card 66 such as, for example, a "smart" card. The store clerk (or the customer) may couple the IC card 66 to the signature device 64 by, for example, inserting the card into a slot provided within the signature device housing. The IC card 66 in this example contains information the signature device 64 can use to verify and authenticate the signature the customer makes on the paper receipt. The signature device 64 can electronically compare signature information provided by IC card 66 with the signature information the signature device electronically captures as a result of the customer signing the paper receipt.

In this example, signature device 64 can produce a real-time indication of signature authenticity (e.g., by lighting an indicator, providing an audible indication, and/or sending an electronic message to the electronic transaction device 52, 54). Such an indication immediately alerts the store clerk to a fraudulent or forged signature. Because verification is performed automatically and electronically, it is more reliable than relying on a store clerk's diligence in visually comparing signatures. Moreover, the electronic signature authentication processes performed by signature device 64 in this example are more accurate and reliable than any visual comparison that could possibly be performed by a store clerk not highly trained in signature authentication techniques.

In an alternate example, a IC card 66 need not be used and electronic transaction device 52, 54 may contact a signature verification template provider 68 over network 58 to obtain information for comparison with the signature captured by signature device 64 at the point of transaction. In this alternate example, signature verification template provider 68 maintains a database of signatures and provides information concerning a particular signature on demand in real-time from the database. The use of a signature verification template provider 68 eliminates the need for customers to carry memory cards 66, but imposes the further requirement of a centralized signature verification database clearinghouse. Some example systems might support both IC card 66 and obtaining signature verification information from a centralized database 68 over a real-time telecommunications network 58, and then could use one or the other (or both) in the process of verifying a customer's signature.

Example Signature Device ("Tablet") 64

Figure 2:
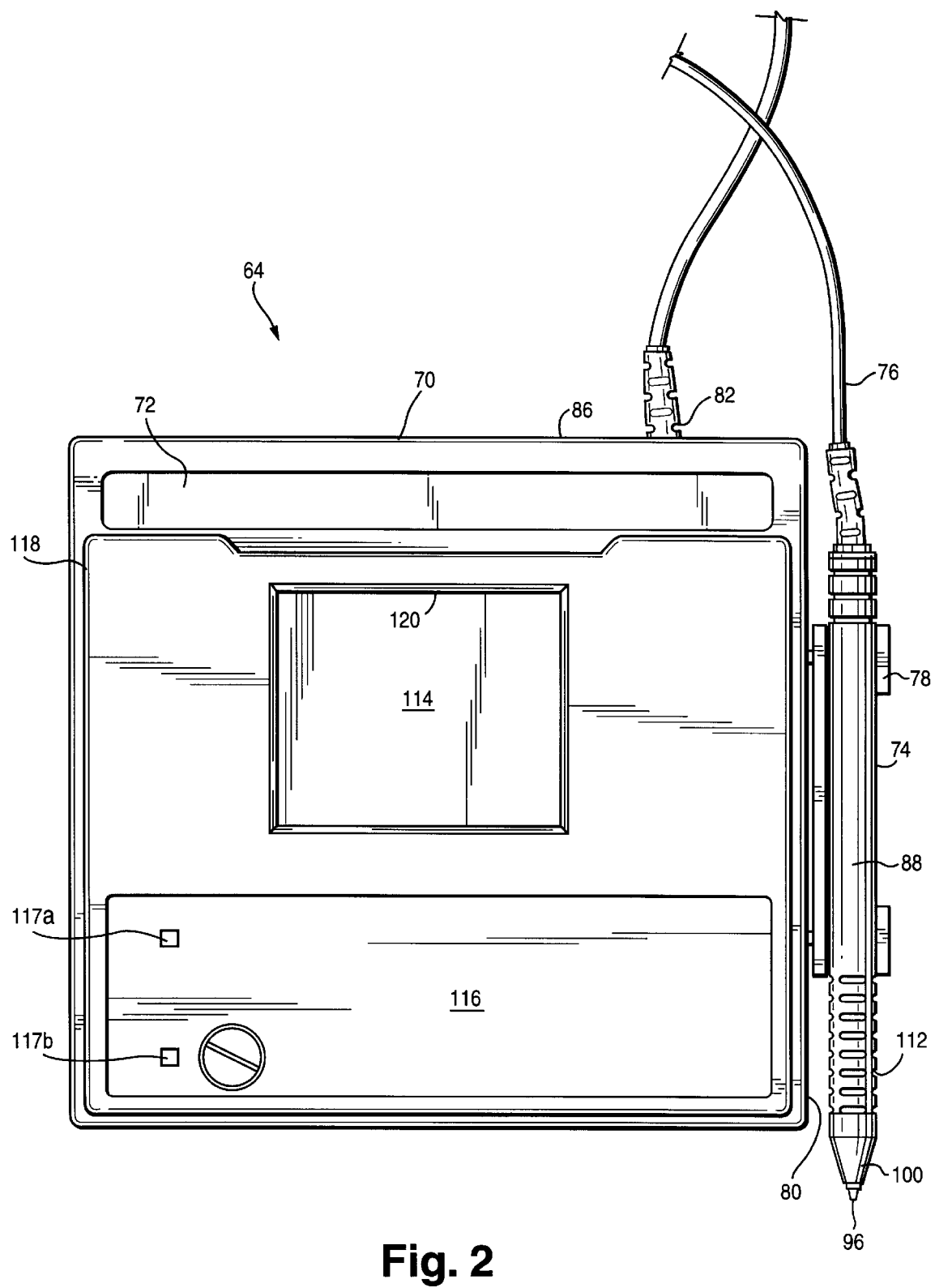
FIGS. 2–4 show top planar, side elevated perspective and rear elevated perspective views, respectively, of an example signature device.
Figure 3:
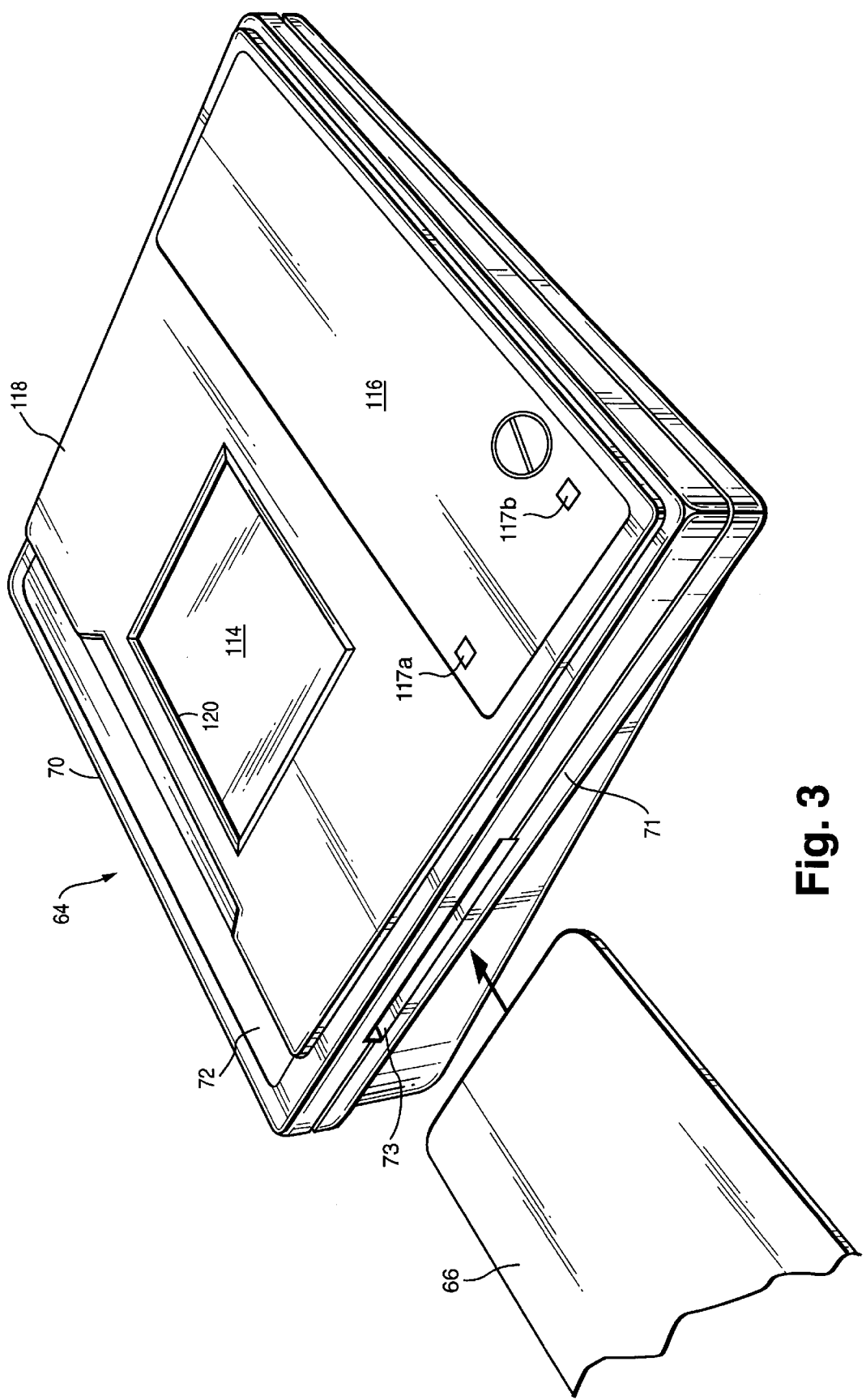
Figure 4:
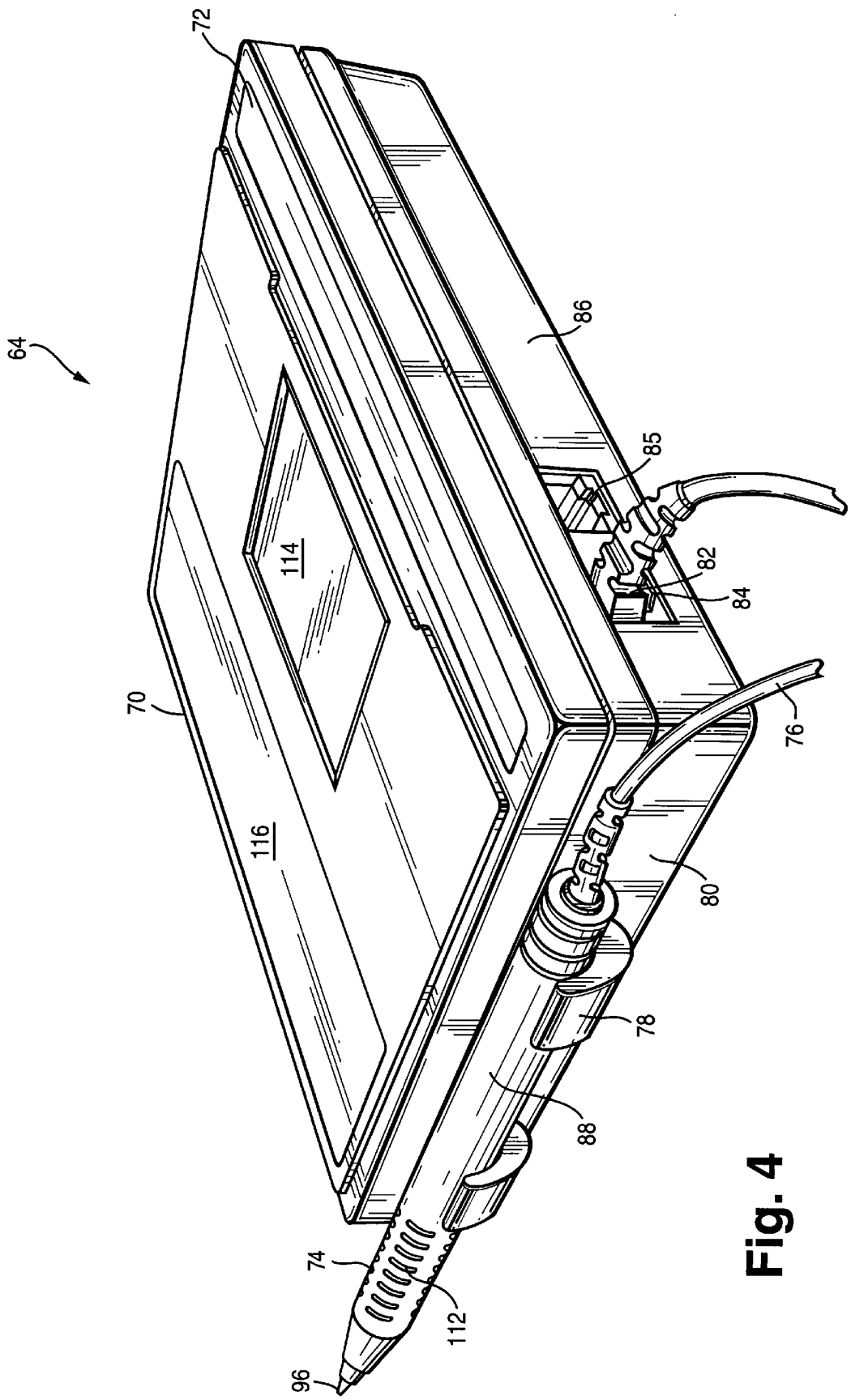

FIGS. 2–4 show different views of an example signature device 64. In this example, signature device 64 includes a housing 70 made, for example, of hard plastic or other durable, rigid material. Housing 70 protects and contains sensitive electronic components of signature device 64, and also provides an inclined top writing surface 72 (see FIG. 3) for placing a paper receipt to be signed. In this example, signature device 64 further includes a pen 74 connected to housing 70 by a cable 76. In this example, a pen cradle 78 is provided on the right-hand side 80 of housing 70. When pen 74 is not being used to sign a receipt, it may conveniently be snapped into cradle 78 to prevent it from being damaged or lost.

As best seen in FIG. 3, housing 70 includes, on a side surface 71, a slot 73 through which a IC card 66 may be inserted for coupling with electronics within the housing. As best seen in FIG. 4, housing rear surface 86 further includes a connector 85 that may be used to connect signature device 64 to electronic transaction device 52, 54. In an alternative embodiment, a wireless connection (e.g., using radio, infrared or other electromagnetic transmissions) may be used to bidirectionally couple digital information for communication between signature device 64 and the electronic transaction device 52, 54. In this example, connector 85 is also used to couple power (e.g., provided by the electronic transaction device 52, 54 and/or by a conventional AC adapter type power supply not shown) to the signature device. Alternatively, a rechargeable or replaceable battery can be included within housing 70 to provide power and provide unencumbered portability.

In this example, signature device 64 uses an electromagnetic sensing technique for sensing the position of the pen during signature capture. Because an electromagnetic sensing technique is used in this example, an ordinary pen will not work with the signature device 64.Instead, a special pen 74 containing electrical coils that emanate and/or receive electromagnetic fields must be used. As can best be seen in FIG. 4, pen cable 76 may terminate in a connector 82 that may mate with a second corresponding connector 84 disposed within housing rear surface 86.

FIG. 4a shows an exploded view of an example special pen 74 suitable for use in this example. As can be seen from FIG. 4a, example pen 74 includes a two-part cylindrical plastic housing 88. The two parts 88a, 88b of pen housing 88 may be selectively joined together using threaded portion 90 (disposed on an end 92 of part 88a) that mates with corresponding threads molded into the interior of pen housing portion 88b. Unscrewing pen housing portion 88b from pen housing portion 88a reveals an interior pen structure that includes a conventional ballpoint pen ink cartridge assembly 94 (although in some applications a non-ink delivering stylus might be used instead). Assembly 94 includes an ink stylus 96 that normally protrudes through an opening 98 defined within a conical end portion 100 of pen housing portion 88b. Pen housing 88 has molded near its stylus end 100 a plurality of circumferential grooves or channels 112 to assist in grasping pen 74 during the signing process.

The conventional ink cartridge 94 and associated stylus 96 (which may or may not be replaceable) deliver ink onto a paper charge receipt disposed on signature device inclined writing surface 72. However, in this example the signature device 64 is electromagnetic—not pressure sensing—so that the pressure exerted by the stylus onto the signing surface has no function with respect to the electronic capture of the signed signature. The electronic signature capture function is instead performed in this example by using electromagnetic coil 102 that in this example is wound around a plastic cylindrical coil form 104 defining an interior cylindrical passageway through which ink cartridge 94 passes and ink stylus 96 protrudes.

In this example, coil 102 may comprise one or several hundred windings of fine insulated copper magnet wire wound around cylindrical plastic coil form 104. Coil form may be electrically connected to pen cable 76 via a two-conductor ribbon cable 106 that runs the length of the interior of pen housing 88. Coil form 104 (and thus coil 102) may be mechanically supported by a clear cylindrical rigid plastic tube 108 that is tightly fitted within the cylindrical passageway 110 defined within pen housing part 88a. Plastic tube 108 may be hollow and have a sufficiently large internal diameter to contain and also retain conventional ink cartridge assembly 94.

FIG. 4b shows the electrical diagram of the FIG. 4a pen assembly. As can be seen from FIG. 4b, electromagnetic coil 102 in this example comprises a single coil that is directly electrically connected via cable 76 to a pair of conductors 82(1), 82(2) defined within pen electrical connector 82. Additionally, pen 74 may include a pressure sensor material (e.g., carbonized rubber) 103a whose resistance varies with pressure. This material 103a may be disposed in a recess 103b defined within an end piece 103c that is pressure fitted to the non-stylus end 94a of ink cartridge assembly 94. Material 103a is also in contact with an electrical contact strip 103d bearing two electrical contact portions (not shown) that are each in electrical contact with material 103a. Material 103a and contact strip 103d together act as a micro switch 103 that closes when pressure is applied to stylus 96 indicating that the pen is in contact with writing surface 72. In particular, as pressure is applied to stylus 96, the cartridge assembly 94 transmits the pressure to material 103a which is compressed and thus provides sufficient electrical conductivity to make contact between the two electrical contact portions defined by contact strip 103d.

Figure 4C:
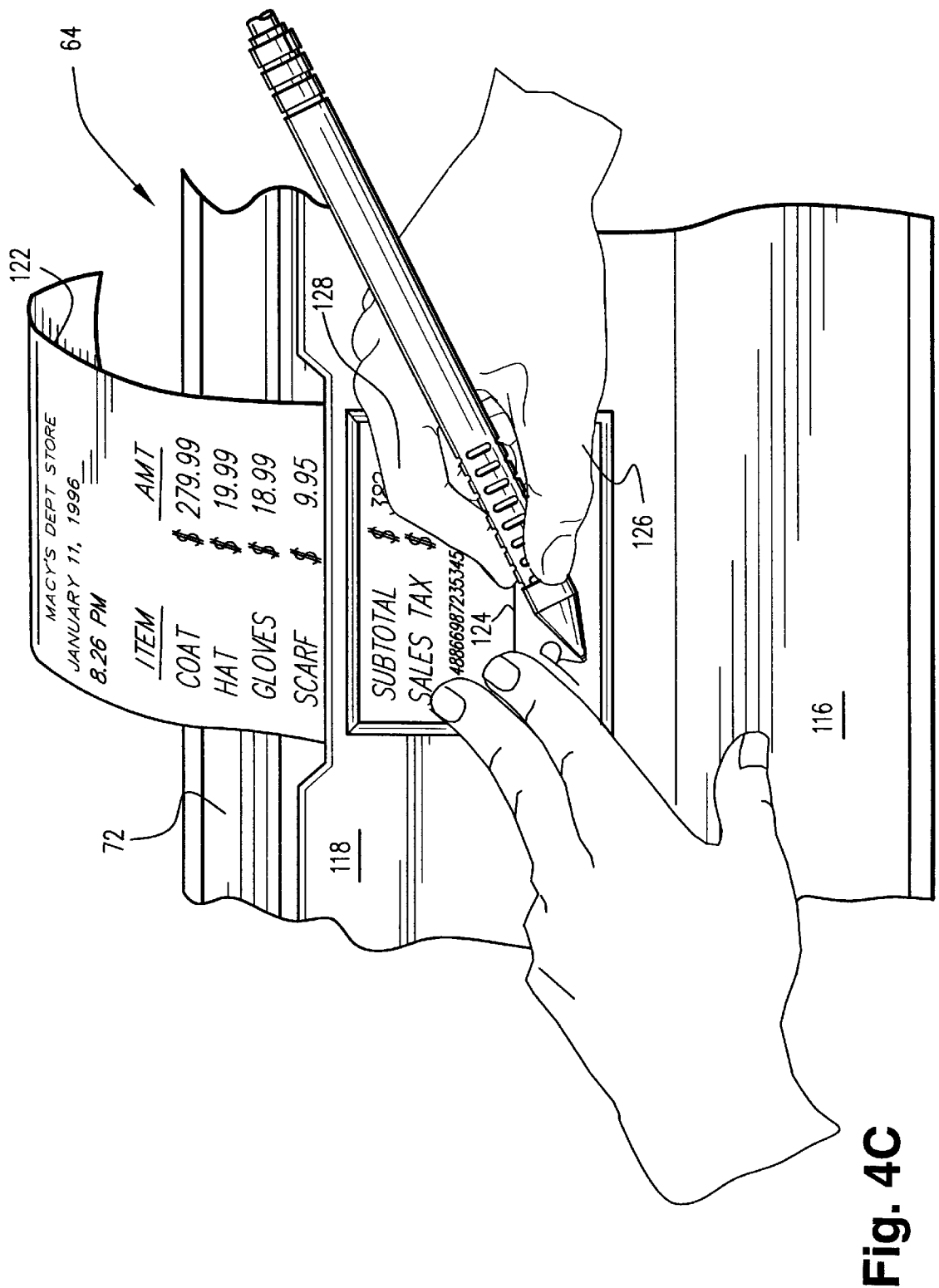
FIG. 4c shows an example use of the signature device shown in FIGS. 2–4 to capture a signature at the point of transaction.
Figure 4D:
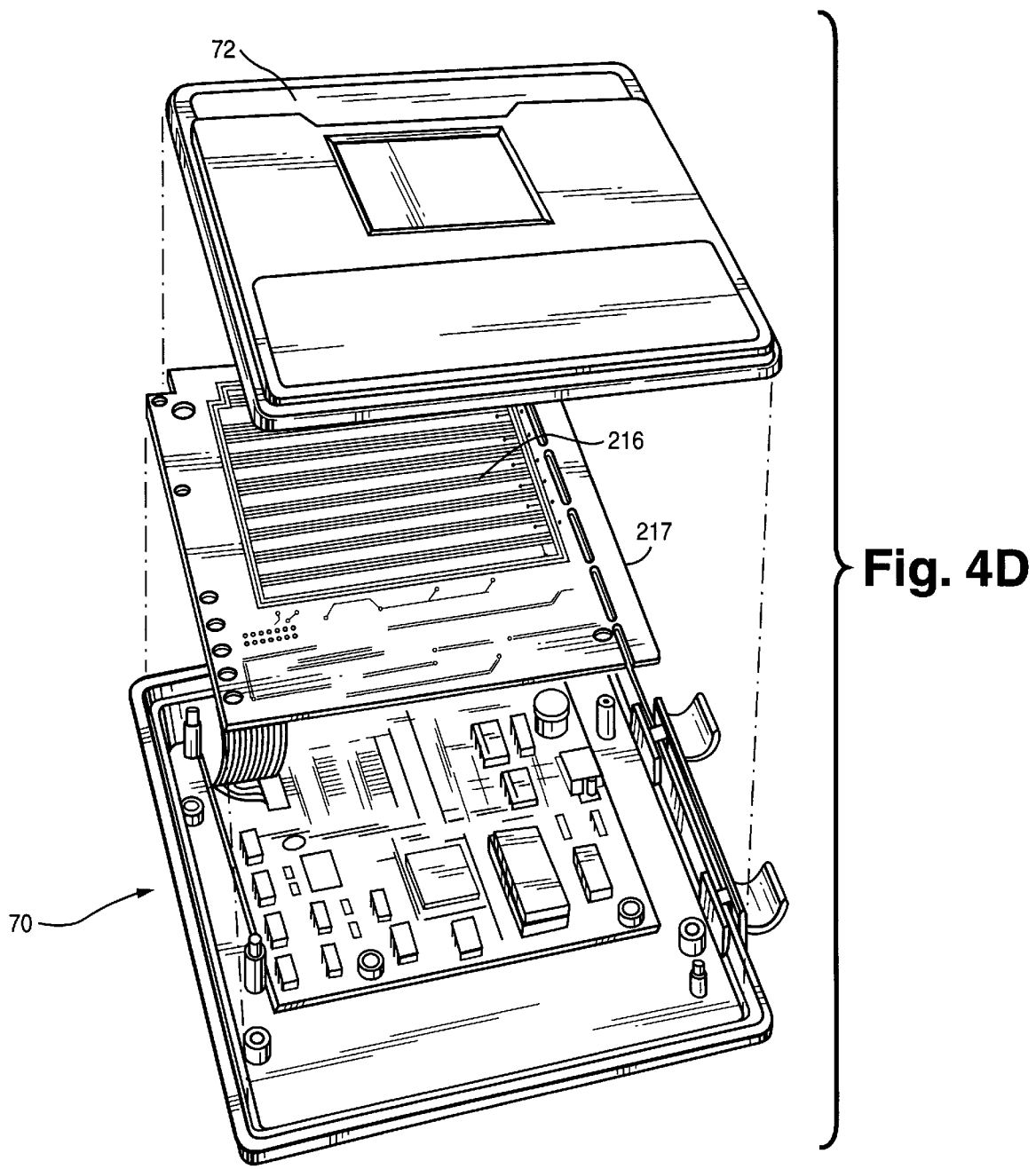
FIG. 4d shows an example exploded view of the FIG. 4 signature capture device.

Referring once again to FIG. 2, signature device housing 70 includes a top relatively planar inclined surface 72. In this example, surface 72 includes a writing area 114 and a hand rest surface 116. In this example, surface 72 comprises a solid rigid plastic piece incapable of transmitting any pressure therethrough (although it is transparent to electromagnetic fields). An electromagnetic coil assembly (see FIG. 4d exploded view of device 64) is mounted within housing 70 well below the level of surface 72 in the plastic plate which defines it. Electromagnetic coil array 216 in this example is disposed on a completely separate printed circuit board 217. The coil array 216 senses electromagnetic fields emanating from pen coil 102 while requiring no physical contact whatsoever between the pen stylus and the circuit board 217. In fact, top plate structure 72 serves to prevent any such physical contact between the pen stylus and the printed circuit board 217—thereby protecting the printed circuit board and the copper trace ways defined thereon. In this example, pen 74 transmits fields wirelessly through the plastic top plate 72 so that they can be sensed by the electromagnetic coil array 216 on printed circuit board 217.

Thus, unlike prior "pressure sensing" signature devices, the device 64 in this example does not sense signature pressure to capture any signature patterns. As described above, there is a pressure-activated microswitch 103 within pen 74 that senses pen up/down position—but this only is used to determine the start and end of signature in this example and is not used in any way to detect or sense signature patterns.

The use by device 64 of electromagnetic as opposed to pressure sensing techniques has several advantages. For example, a customer can press down with his hand directly on writing area 114 (e.g., to hold a printed receipt and prevent it from moving—see FIG. 4c) without any adverse affect whatsoever on the signature capture process. In addition, different receipt thicknesses and different customer signing pressures are all automatically accommodated since they have no affect whatsoever on signature capture. These features and advantages—which are fundamentally different from a signature capture device based on pressure sensing technology—provide a more advantageous, reliable and cost effective system.

In this example, housing 70 defines a solid rigid top sheet structure 118 that overlays surface 72 and is spaced apart from writing area 114 by a small dimension (e.g., $\frac{1}{16}$ of an inch). Structure 118 in this example may comprise, for example, a sheet of solid rigid plastic fixedly attached to housing upper surface 72 in the area of hand rest surface 116. Structure 118 in this example defines a V-shaped (in cross-section) paper receiving pocket secured at the hand rest surface area 116. The V-shaped pocket is positioned to permit a paper receipt to be loosely inserted between structure 118 and top surface 72.

Figure 4E:
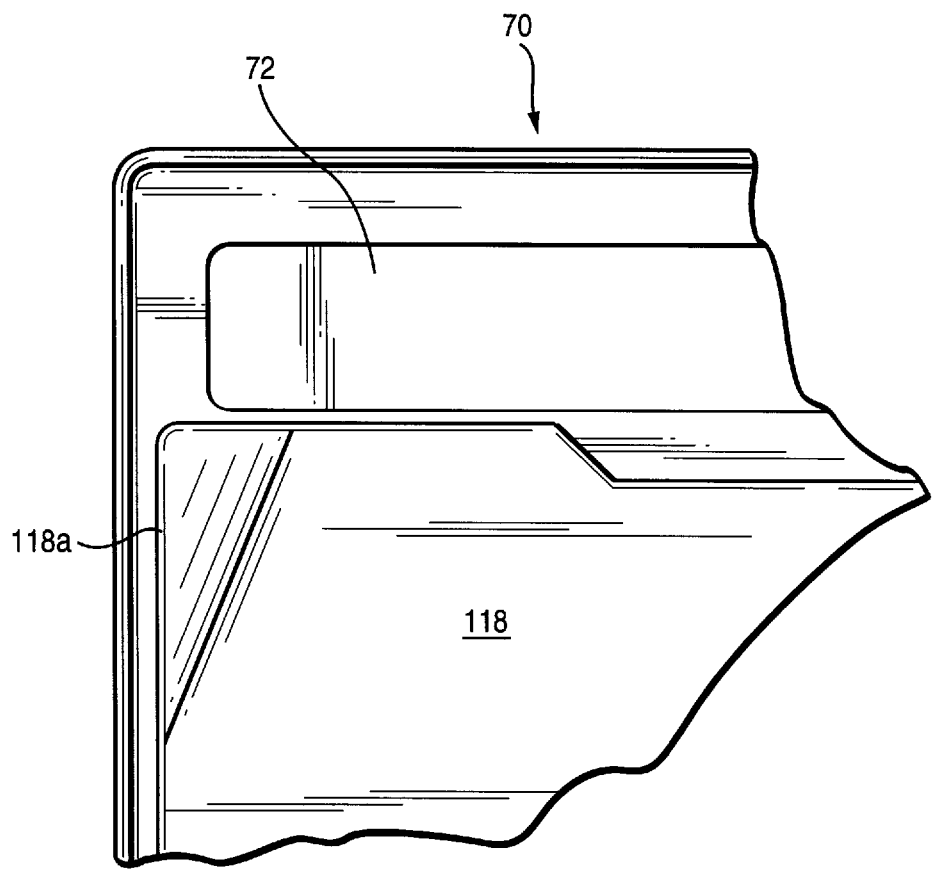
FIG. 4e shows an example alternate housing design including a capability to insert a record member from either the top or the side.

As shown in FIG. 4e, an alternate configuration of structure 118 allows a receipt to be inserted either from the top or from the side of device 64. This alternate configuration for structure 118 includes, in this example, a small upwardly projecting "folded" portion 118a to allow more easy insert of a paper receipt from either the top or the side.

In this example, structure 118 defines a rectangular opening or window 120 in approximately the center of housing upper surface 72. Window 120 is coextensive with an electromagnetic sensing area defined by electronics within housing 70. This bounded window region 120 defined by structure 118 is spaced above and in registry with writing area 114.

In use (see FIG. 4c), the sales clerk slides at least a signature portion of a paper receipt 122 to be signed between housing upper surface 72 and structure 118 so that a signature line 124 is fully within and accessible through window 120. The customer lifts pen 74 from its cradle 78 and grasps the stylus end of the pen between thumb and forefingers at grooves or channel 112. The user then rests the heel 126 of his or her writing hand 128 on signature device 64 hand rest portion 116, lowers the pen stylus 96 into contact with paper receipt 122, and proceeds to sign his or her signature on the paper receipt using the ink delivered by ink cartridge 94 to ink stylus 96. As the customer lowers the pen stylus 96 into contact with paper receipt 122, signature device 64 automatically, electronically detects proximity and contact between internal pen 74 and signing surface 114 (e.g., by closing of switch 103 within pen 74 discussed above).

In response to such electronic detection, signature device 64 begins to sense and capture, through electromagnetic detection techniques, the instantaneous position of pen stylus 96 throughout the time the customer is signing the paper receipt 122. Signature device 64 "samples" the position of electromagnetic coil 102 in two dimensions (x,y) through use or electromagnetic coil array 216 well below plate 72. Sampling is performed at periodic intervals during the time the customer signs his or her signature. These samples are stored in an electronic memory within housing 70 (they may be compressed first to minimize storage requirements). These electronically stored digital samples may be used recreate an electronic image of the signature (e.g., on a printer or display), and if desired may be used for comparison purposes with an authentic signature of the customer provided via a IC card 66 or via network 58 as described above. In this example, hand rest portion 116 includes indicators 117a, 117b (e.g., light emitting diodes) that may be used to provide an instantaneous "go-no go" indication of successful signature capture and/or verification.

Example Internal Electronics of Signature Device 64 and IC card 66

Figure 5:
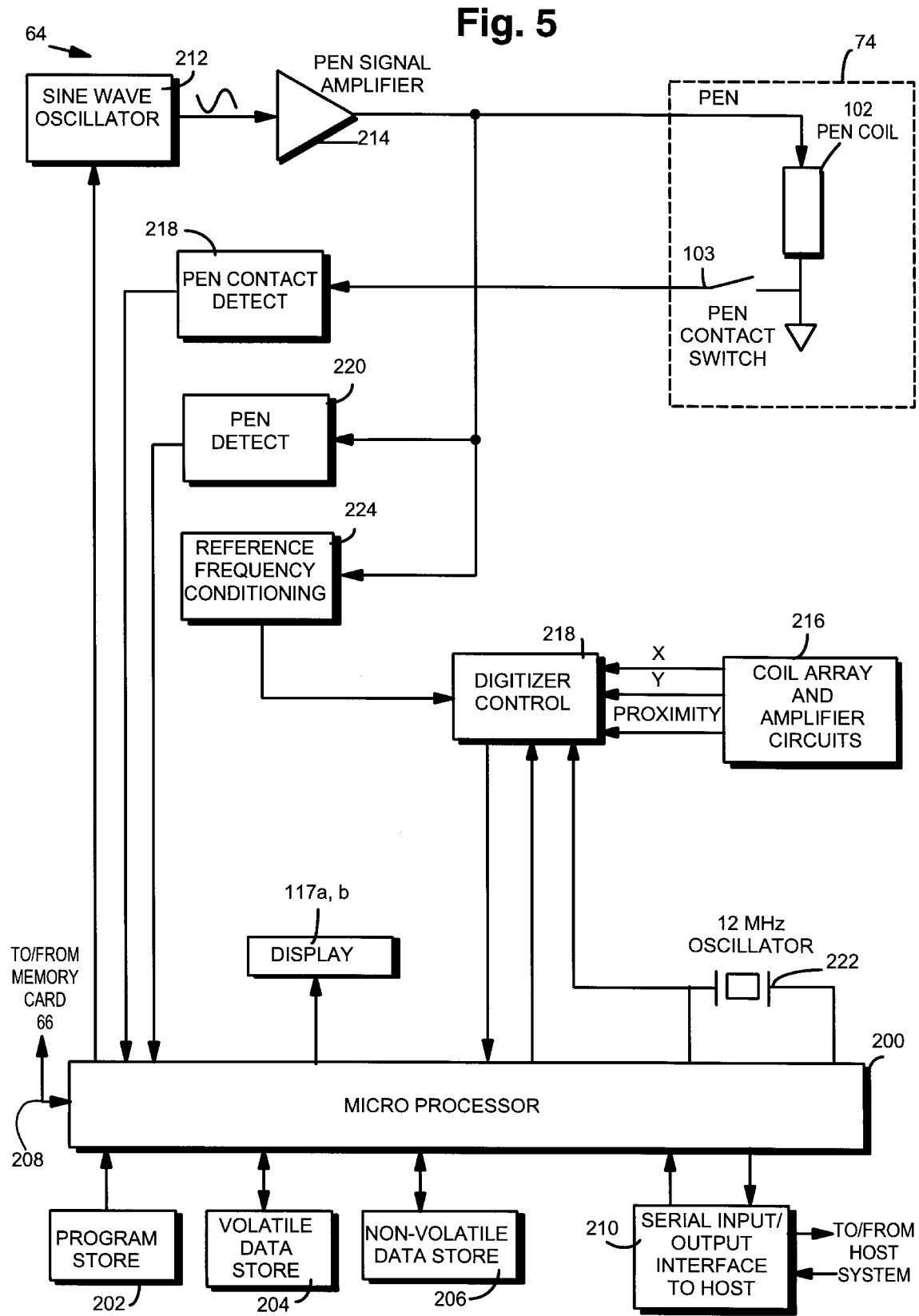
FIG. 5 shows an example circuit block diagram for the device shown in FIGS. 2–4.

FIG. 5 shows example internal electronics within signature device 64. In this example, signature device 64 includes a microprocessor 200 that performs operations under control of computer program instructions stored within a program store 202. Microprocessor 200 comprises the "brains" of signature device 64, controlling substantially all of the functions performed by the signature device and communicating with the outside world. For example, microprocessor 200 can write data to and/or read data from a volatile data store 204, and may read data from or write data to a non-volatile data store 206. In this example, microprocessor 200 may also write data to and/or read data from a portable IC card 66 via path 208 if a memory card is coupled to signature device 64.

Microprocessor 200 communicates signature capture and/or verification results in this example to electronic transaction device 52, 54 (or other host) via a serial input/output interface 210. Microprocessor 200 may also receive commands, data and other information (e.g., signature profiles for comparison purposes) from a host via the serial interface 210. In this example, interface 210 connects to the peripheral connector 85 on the signature device 64 described in connection with FIG. 4. Microprocessor 200 may use the techniques described in copending commonly-assigned application Ser. No. 08/388,063 of Graham entitled "Payment Automation Device Host Interfacing and Discrimination" (hereby incorporated by reference herein) to automatically sense and adapt to the protocol used by a host computer for communicating with signature device 64. As discussed above, if desired, serial input/output interface 210 may communicate to a host system wirelessly via electromagnetic transmission techniques.

In this example, microprocessor 200 may also selectively illuminate indicating lights 117a, 117b (or other display) and/or may provide an audible indication by sending signals to appropriate conventional components such as light emitting diodes and associated drivers and/or piezo-electric transducers or miniature loudspeakers. Microprocessor 200 may also receive inputs from a user via a manually operable user input device.

In this example, microprocessor 200 controls a variety of electronic components signature device 64 uses for the signature detection process. For example, microprocessor 200 selectively enables and disables a sine wave oscillator 212 that generates an alternating current (ac) sine wave signal of fixed frequency. This AC signal is amplified by a pen signal amplifier 214 and is applied to pen coil 102—thereby allowing the pen coil to emanate an electromagnetic signal that can be detected by a pen coil array and associated amplifier circuits 216. In this example, microprocessor 200 may activate sine wave oscillator 212 when an instruction is received from the host. Pen contact detect circuit 218 responds to the closure of pen contact switch 103 as described above. A pen detect circuit 220 allows microprocessor 200 to detect whether an operational pen is connected.

Microprocessor 200 detects the position of pen coil 102 using coil array 216 and digitizer control 218. Coil array 216 may be conventional in design and may operate as described in U.S. Pat. No. 4,240,065 to Howbrook. Digitizer control 216 receives x,y and proximity (i.e., signal strength) signals from coil array and amplifier circuits 216, digitizes these signals values using conventional analog-to-digital conversion techniques, and provides digitized samples to microprocessor 200 for storage in volatile data store 204 for example. A 12 MHz oscillator 222 may control the digitizer speed (i.e., sampling rate). A reference frequency conditioning block 224 coupled to the output of pen signal amplifier 214 is used to provide a digital (e.g., square wave) version of the AC drive signal applied to pen coil 102 for use by digitizer 218.

Figure 6:
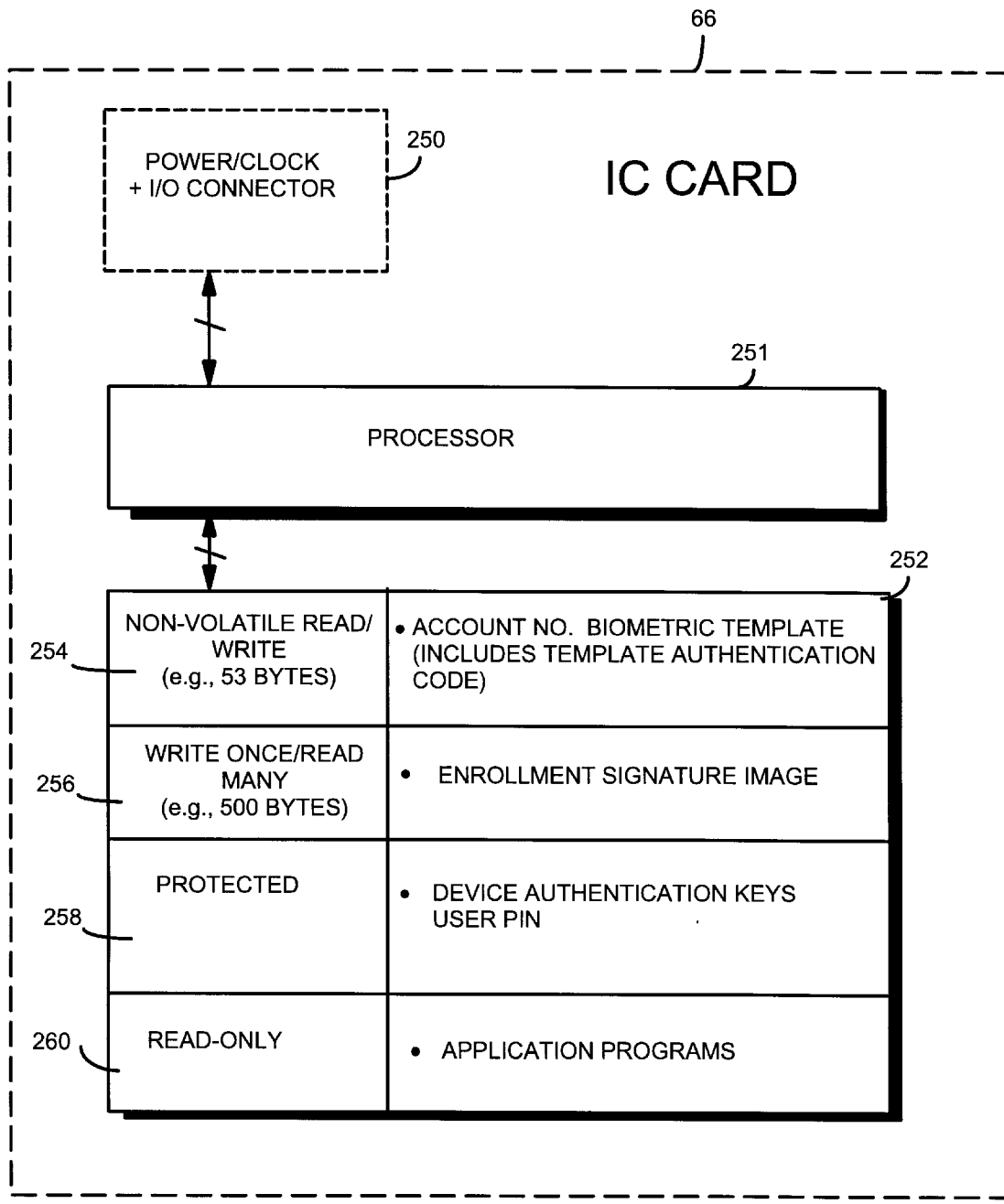
FIG. 6 shows an example internal structure of an electronic portable IC card suitable for use with the device shown in FIGS. 2–4.

FIG. 6 shows an example internal electronic structure for IC card 66. In this example, the memory card may include a conventional power, clock and input/output connector 250 (or alternatively the card may provide a connectorless design providing electromagnetic coupling for such signals for example), a processor 251, and an internal semiconductor memory 252. Memory 252 may include a variety of different memory components such as, for example, a non-volatile read/write memory 254, a write one/read many non-volatile memory device 256, a protected memory device 258, and a read-only memory device 260. Processor 251 may provide protection for access to memory device 252, and may provide other additional processing capabilities as desired. In some example arrangements, each of memory devices 254–260 may comprise a different portion of the same overall semiconductor memory (e.g., a battery backed random access memory). In other examples, different types of memory devices can be used for the different memory storage areas 254, 256, 258, 260 to provide additional flexibility.

As can be seen in FIG. 6, the different memory storage portions 254, 256, 258, 260 may be used to store different types of information. For example, the non-volatile read/write memory 254 may store user account number, signature templates, and template authentication codes in this example. The write-one/read-many memory storage portion 256 may be used to store, for example, enrollment signature image information. The protected memory portion 258 may be used, for example, to store sensitive information such as device authentication and/or encryption keys and user personal identification number. The read only memory portion 260 may, if desired, provide application programs to supplement the programs stored within program store 202 for execution by microprocessor 200.

Example Signature Capture Using Data Compression and Encryption

Figure 7:
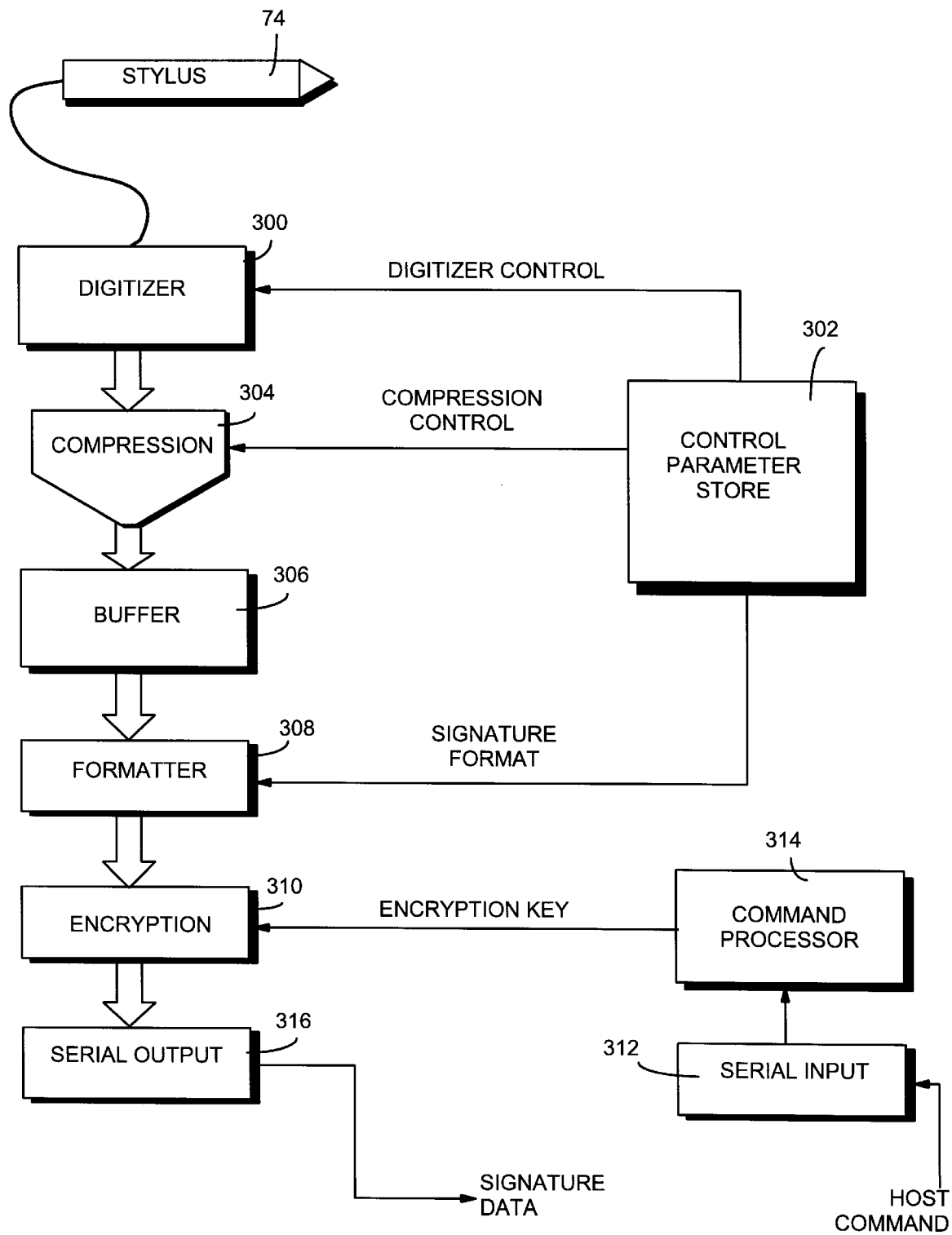
FIG. 7 shows an example signature capture process.

FIG. 7 shows an overall example process performed by the example signature device 64 for capturing a customer's signature. In this example, signals provided by pen 74 are received and processed by coil array and amplifier circuits 216 and provided to digitizer control 218 for digitization (block 300). Microprocessor 200 may control the digitizing step 300 based on control parameters (block 302) stored, for example, in program store 202 or non-volatile data store 206. Such digitizer control parameter may, for example, control the number of samples to be collected, and type of data representation (binary, ASCII), etc.

Upon receiving the digitized signal samples, microprocessor 200 may compress the stored samples to provide a more compact digital representation (compression block 304). Compression block 304 may be performed under software control using conventional or special compression algorithms as controlled and defined by control parameters (block 302) and instructions stored within program store 202 and/or non-volatile data store 206. The output of the compression block 304 may be temporarily buffered (block 306) by storing the compressed data within volatile data store 204, for example.

Microprocessor 200 may then format the compressed signature data under software control as determined by control parameter store 302 to provide a predetermined digital signature format used, for example, by server 62, financial institutions 56, credit card companies 60, signature verification information provider 68 and/or electronic transaction devices 52, 54 (block 308). Signature formatting may be performed under control of control parameters 302 based on type of data representation.

The formatted signature information may then be encrypted (encryption block 310) using conventional or special encryption techniques. Encryption block 310 may be used, for example, to allow a receiving host computer to verify the authenticity of a captured signature file or for security reasons. In this particular example, a host may provide an encryption key for use by encryption block 310. Signature device 64 may receive the encryption key (serial input block 312) and process it (process block 314) for use as an encryption key by encryption block 310. The encrypted signature image output of encryption block 310 may be provided to a host (e.g., electronic transaction device 52, 54) via serial input/output interface 210 (serial output block 316).

Figure 8:
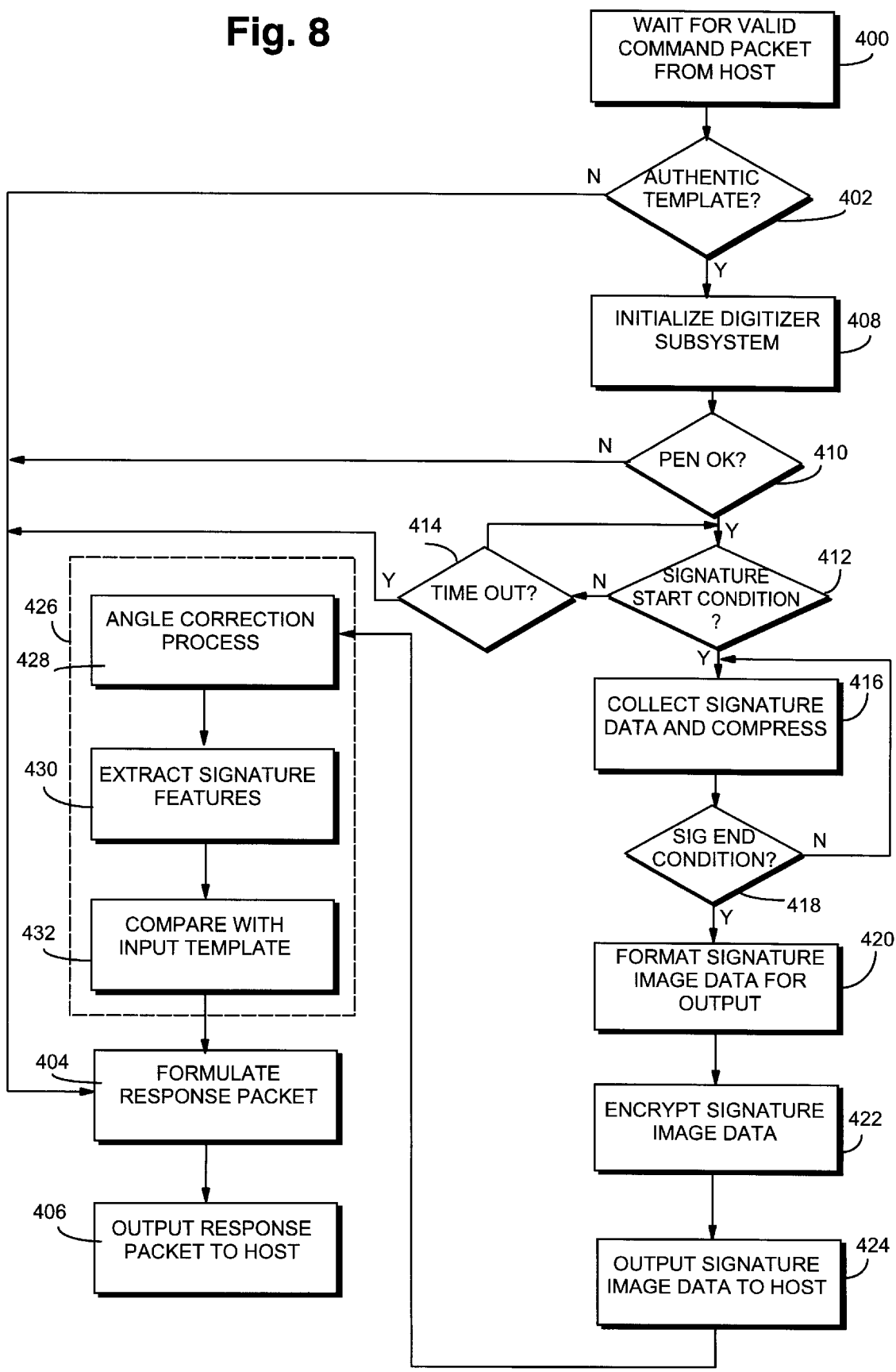
FIG. 8 shows an example signature capture/verification process performed under software control.

FIG. 8 shows a more detailed process performed by microprocessor 200 under software control using control parameter store 302 to capture and verify a signature. In this example, microprocessor 200 waits for a valid command packet from a host (e.g., electronic transaction device 52, 54) instructing the signature device 64 to capture and verify a customer's signature (block 400). In response to receipt of a command, microprocessor 200 in this example retrieves a signature template for verification purposes (e.g., by reading it from IC card 66 and/or by extracting it from the host command packet). Microprocessor 200 may then test whether the template is authentic (decision block 402). Decision block 402 testing whether the template is authentic may be performed, for example, by examining certain codes embedded within the template, decrypting a portion or all of the template using an embedded algorithm and key or using other authentication techniques. If the template is not authentic ("no" exit to decision block 402), microprocessor 200 proceeds no further but instead formulates a response packet (block 404) indicating failure which it outputs to the host (block 406).

Assuming the signature template for comparison purposes is acceptable ("yes" exit to decision block 402), microprocessor 200 next initializes digitizer 218 and tests the operation of pen 74 via pen detect circuit 220 (block 408, decision block 410, respectively). If the decision block 410 indicates that the pen is inoperable or not connected, microprocessor sends an associated error message to the host (blocks 401, 406). Otherwise, microprocessor 200 waits for a start condition (decision block 412) such as, for example, the closure of pen contact switch 103.

In this example, microprocessor 200 may impose a time out restriction to begin signature capture (decision block 414). If too much time elapses between the receipt of the host command packet (block 400) and the time a customer begins to sign a receipt ("yes" exit to decision block 414), microprocessor 200 may send an associated error message to the host (blocks 404, 406).

Otherwise, upon receipt of the start signal condition ("yes" exit to decision block 412), microprocessor 200 uses coil array 216 and digitizer control 218 to collect signature data. Microprocessor 200 in this example compresses the signature data "on the fly" during signature capture to provide a more compact digital representation (block 416) so that the entire signature image never needs to be stored in uncompressed form (this allows volatile data store 204 to be much smaller than it would otherwise need to be). The signature data collection process (block 416) may continue until an end condition signal has been generated (e.g., opening of pen contact switch 103 for a specific time period as controlled by control parameter store 302—as tested for by decision by block 418). Upon receipt of the end condition signal ("yes" exit to decision block 418), microprocessor 200 formats the signature image data for output as discussed above (block 420), encrypts the signature image data (block 422) and outputs the compressed encrypted signature image data to the host (block 424). In an alternative operation, as controlled by control parameter store 302, the microprocessor 200 will compress the signature down to a predetermined number of bytes through an iterative process.

In this example, an additional process 426 is performed to verify that the captured signature compares favorably with a predetermined signature pattern represented by the template authenticated by decision block 402. In this particular example, microprocessor 200 begins this verification process by accessing the signature image data prior to formatting and encryption by blocks 420, 422. It performs an angle correction process 428 on the signature image data to compensate for different signal orientations (block 428). This angle correction process is shown in more detail in FIGS. 8a–8e.

Figure 8A:
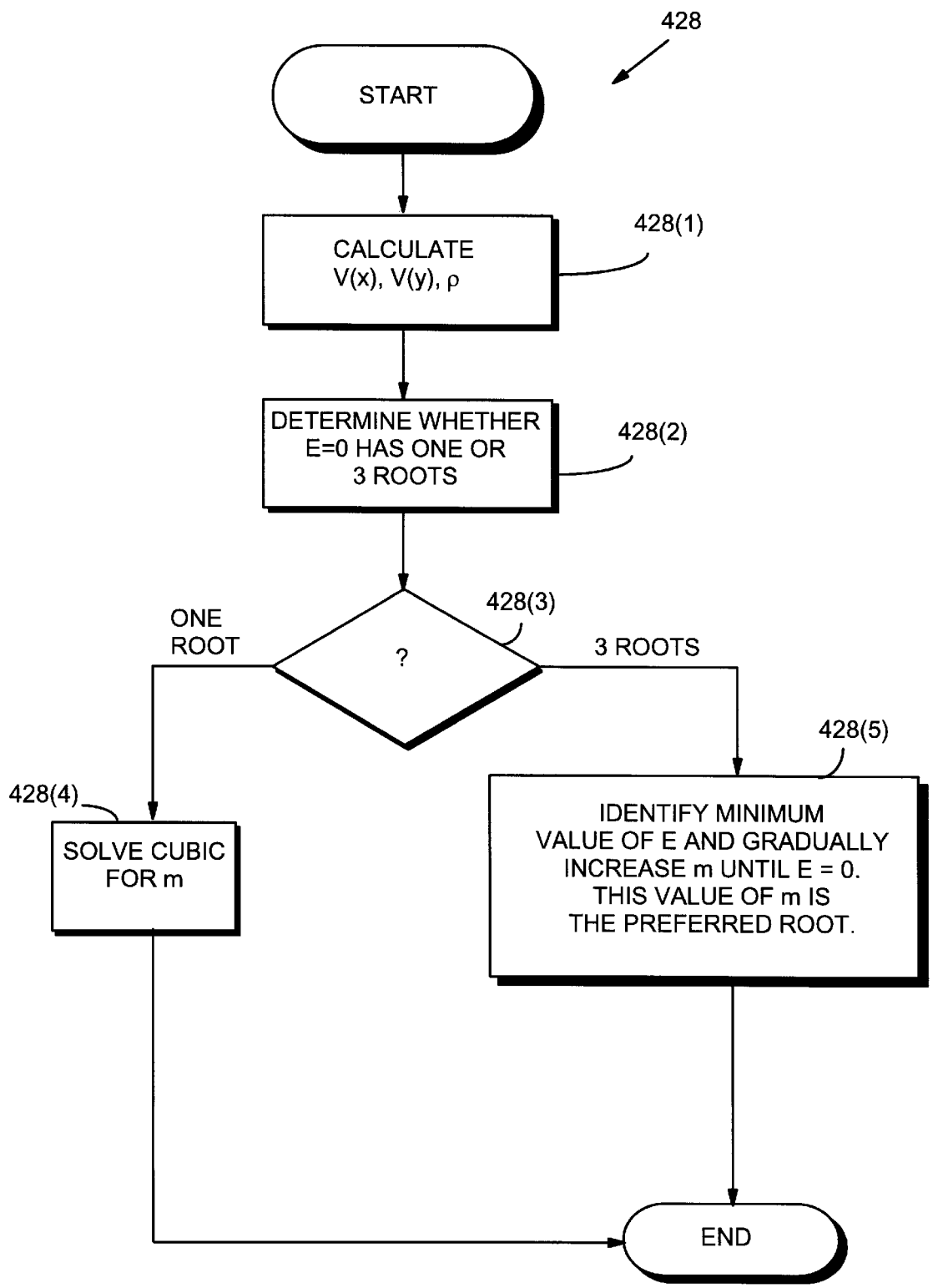
FIGS. 8a–8e show example angle correction processes.
Figure 8B:
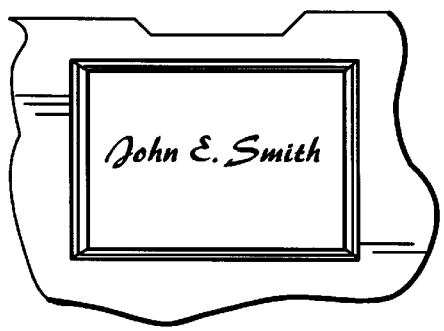
Figure 8C:
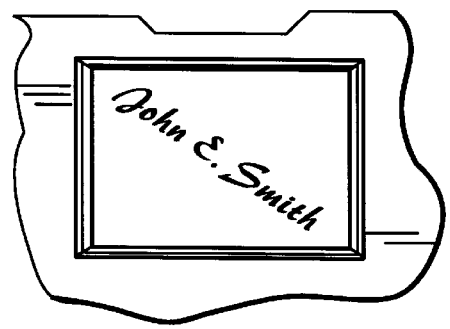
Figure 8D:
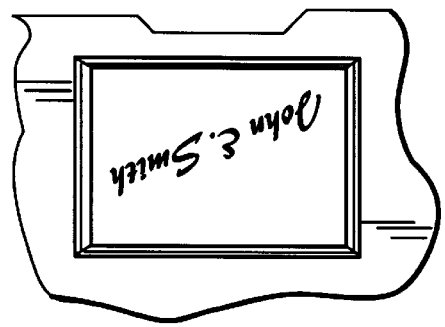

FIG. 8a shows detailed steps involved in performing an example preferred signature angle correction process 428. Angle correction permits reliable signature verification despite different signature orientations. For example, FIGS. 8b, 8c and 8d show various different signature orientations with respect signature window 120. In this preferred example, signature device 64 can reliably verify each of these signatures (and signatures made at most other arbitrary angles relative to the x,y coordinate system of the writing area 118) by applying angle correction before the verification comparison is made. This allows greater flexibility in not requiring a printed receipt or other record member to be disposed in any predetermined position relative to writing surface 114—and to allow the customer to sign a record member at any arbitrary angle.

This example uses an improved angle correction technique based on solving a cubic expression. Briefly, it operates by minimizing the sum of squares of perpendicular distances between x,y coordinate data representing a captured signature and the line of regression. The captured signature coordinate data is then transformed relative to the determined line of regression so it can be compared relative to a signature template expressed in terms of a reference axis x. The technique used in this preferred example provides improved results as compared to prior techniques that use a simple linear equation and minimize the sum of squares of horizontal or vertical distances between the x,y coordinate data and the regression line.

Figure 8E:
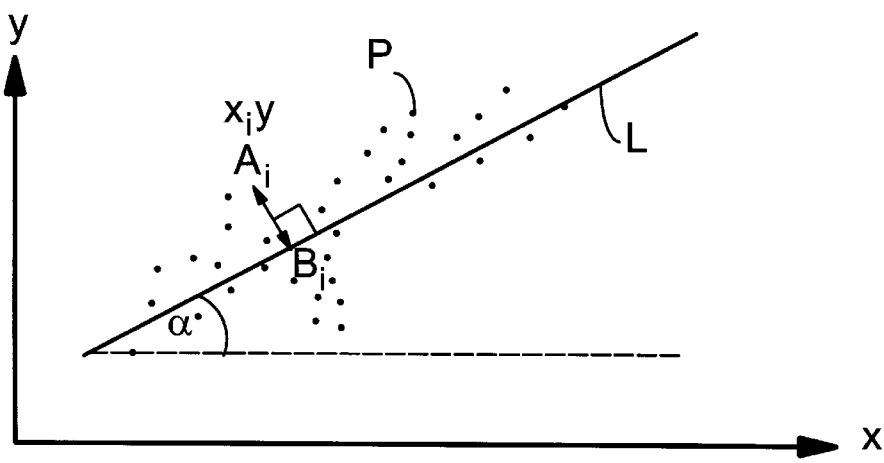

In more detail, the preferred example angle correction technique determines the regression line defined by m=tanα such that the sum of squares e=Σ(AiBi)² (perpendicular distance) is minimized. FIG. 8e graphically shows these quantities. In the preferred technique, it is the perpendicular distance between the line of regression L defined by tanα (i.e., the angle between the x reference axis and the line of regression) that is minimized for the set of captured signature sample points P. This reduces to the solution for m in the following cubic equation:

$$E = 2am^3 - m^2(2\rho+a) + 2m\,(\rho+a) - (2\rho+1/a) = 0 \qquad \text{(eqn. 1)}$$

where $$a = \sqrt{V(x)/V(y)}$$

(where V is the variance),
m=tanα, and
ρ is the correlation coefficient of the (x,y) coordinate data. Solving cubic equation (1) above results in one or three real roots. In the preferred example, an iterative process is used to select the appropriate root when there are three real roots.

FIG. 8a shows example program control steps performed by microprocessor 200 to perform the angle correction technique 428 described above. The microprocessor 200 first calculates the variances V(x) and V(y), and also calculates the correlation coefficient ρ (block 428(1)). Next, microprocessor 200 determines whether the solution of equation (1) will have one or three real roots (block 428(2)). If the solution will have one real root (left-hand exit to decision block 428(2)), microprocessor 200 solves the cubic form of equation (1) for m (block 428(4)). On the other hand, if the solution will have three real roots (right-hand exit to decision block 428(2)), microprocessor 200 uses an iterative process to determine m from equation (1). Specifically, in this example the microprocessor 200 identifies the minimum value of E (i.e., by differentiating with respect to m to obtain a quadratic), and then solves equation (1) for different incrementally increasing values of m until E=0. The value of m that provides an E=0 solution is the preferred root indicating the line of regression (block 428 (5)).

After performing angle correction process 428, microprocessor 200 extracts significant signature features and compares those features with the inputted, authentic signature template (blocks 430, 432). See FIG. 8f.

Figure 8F:
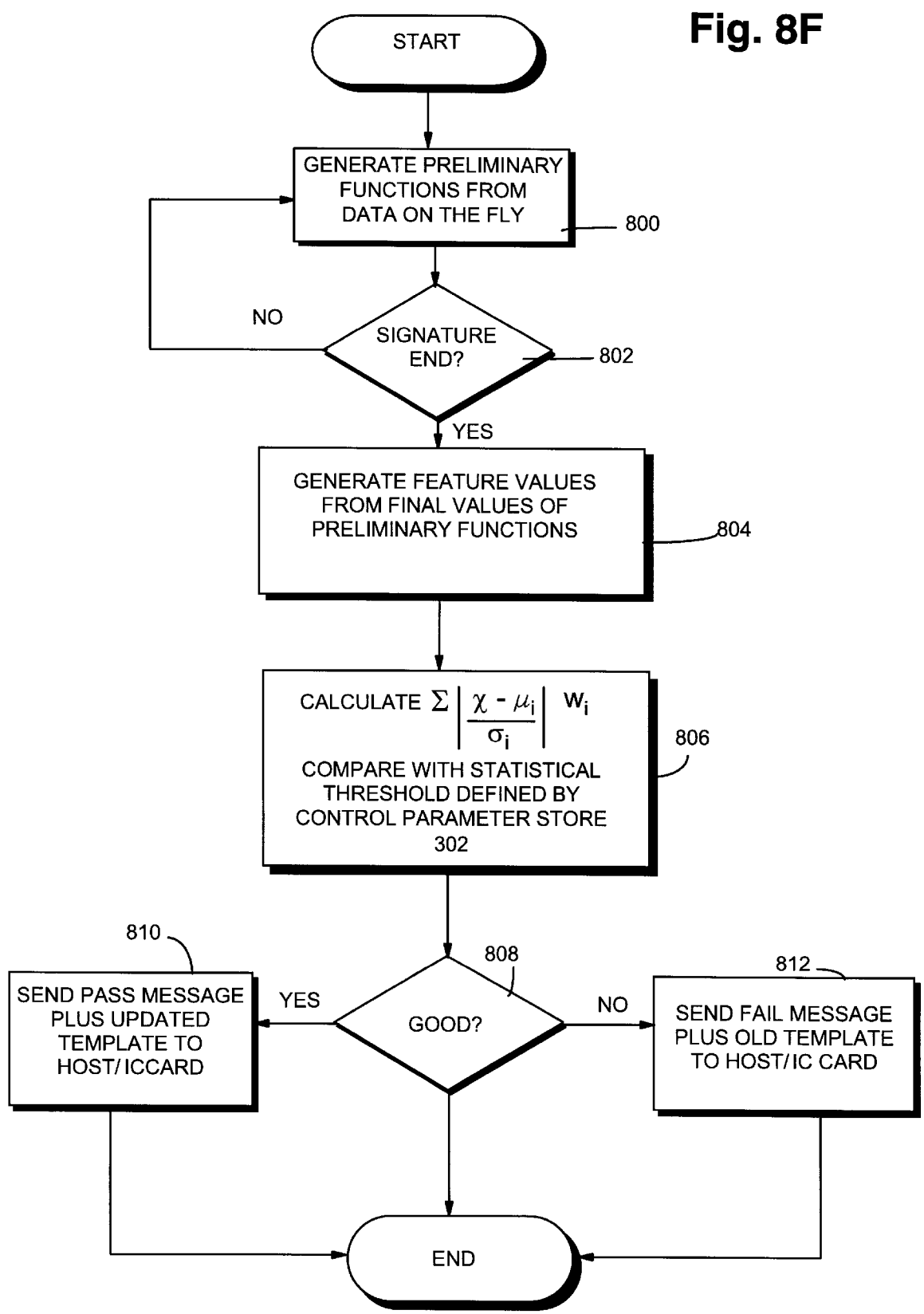
FIG. 8f shows an example signature verification process.

FIG. 8f shows an example feature extraction and signature verification decision process performed in this example by microprocessor 200 based on position coordinates provided by digitizer 218. Microprocessor 200 in this example generates preliminary functions from the coordinate data "on the fly" as the coordinate data is being received (i.e., while the customer is still signing) (block 800). Such preliminary functions may include, for example, a combination of timing and position functions. This "on the fly" feature calculation technique minimizes delay after signing is completed and may also reduce storage requirements. Once a "signature end" signal has been received (decision block 802), microprocessor 200 generates feature values (e.g., position and/or timing features) from final values of the preliminary functions (block 804). Microprocessor 200 then calculates the following expression based on the feature values (block 806):

$$\Sigma \left| \frac{\chi_i - \mu_i}{\sigma_i} \right| w_i, \qquad \text{(equation 2)}$$

where $w_i$ are the weights defined by the size of $\sigma_i$, $\chi_i$ (i=1, ..., 13) are the signature values of features 1 to 13, $\mu_i$ (i=1, ..., 13) are the mean values of features as defined by a verification template for comparison purposes, and $\sigma_i$ (i=1, ..., 13) are the standard deviations of feature values as defined by the verification template.

Microprocessor 200 compares the calculated expression of equation (2) with a statistical threshold defined by control parameter store 302 (also block 806). If the comparison is favorable, microprocessor 200 sends a "pass" message plus an updated template to the host and/or IC card 66 ("yes" exit of decision block 808; block 810). If the comparison is unfavorable ("no" exit of decision block 808), microprocessor 200 sends a "fail" message plus the old (non-updated template) to the host and/or IC card 66 (block 812).

Referring once again to FIG. 8, the output results of comparison block 432 indicate whether the captured signature compares favorably with the inputted template—i.e., whether the captured signature is a true signature or a false signature. Microprocessor 200 formulates a corresponding response packet containing these comparison results and sends it to the host (blocks 404, 406)—and may also generate its own local indication as desired via display 117, audible indication or the like.

Signature Verification Using Memory Card for Biometric Template Storage

Figure 9:
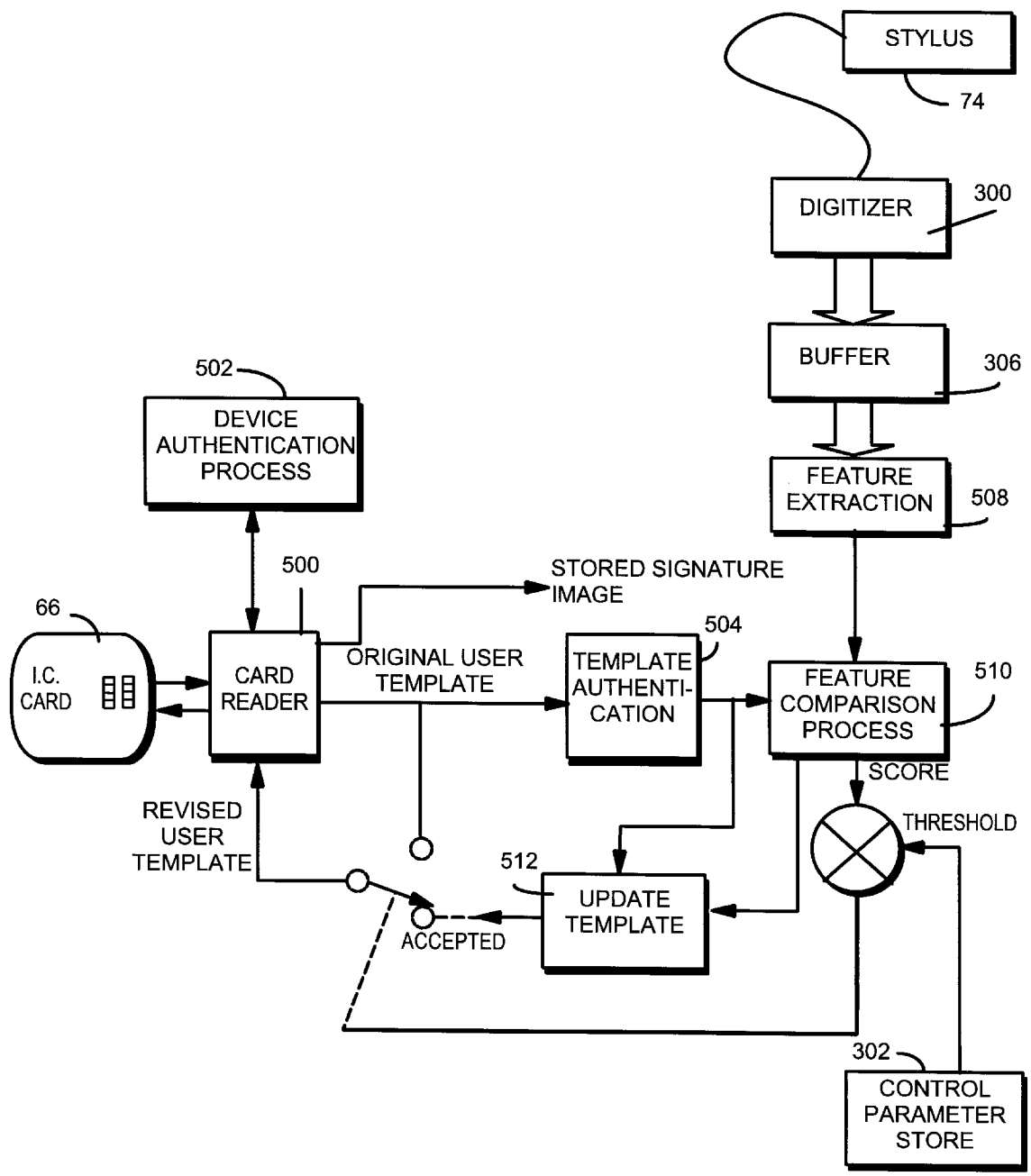
FIG. 9 shows an example signature verification process using an integrated circuit card for biometric template storage.
Figure 9A:
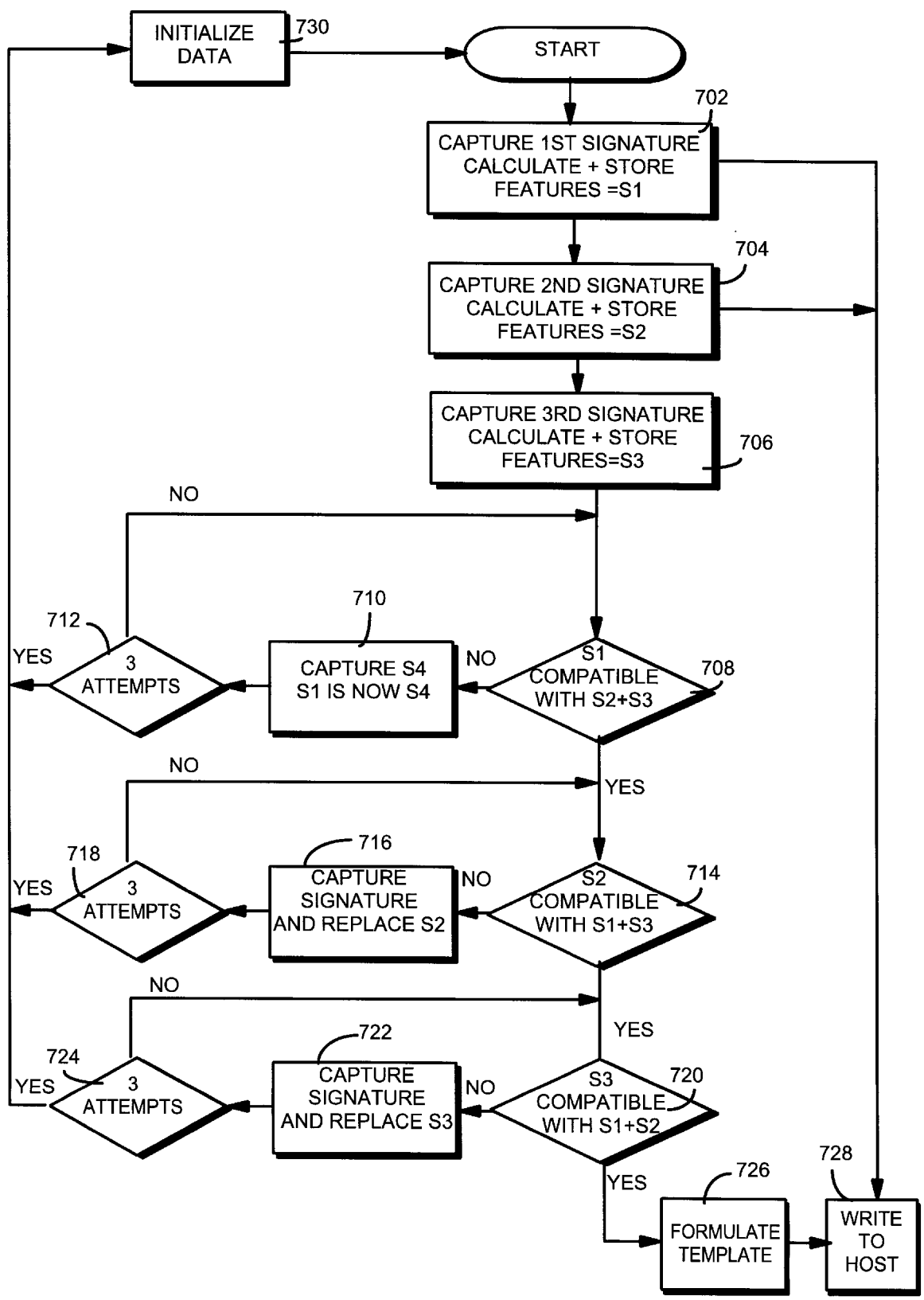
FIG. 9a shows an example enrollment process.

In an alternate embodiment, the signature verification process described above may be enhanced by using a IC card 66 to provide a signature template for verification purposes. The overall process performed by such enhanced example is shown in FIG. 9. In this example, each customer carries with him or her a memory card containing a digital representation of his or her signature. This IC card 66 (which may have the structure shown in FIG. 6) may be issued to the customer by the retailer or a financial institution, for example, when the customer opens a charge or other financial account. The process 700 of initializing IC card 66 may include the following example steps as shown in FIG. 9a:

(1) Ask customer to sign blank receipt on signature device 64 and capture customer's signature; calculate and store features of first captured signature (block 702);

(2) Ask customer to again sign blank receipt using signature device 64; capture second signature; calculate and store features of second captured signature (block 704);

(3) Ask customer to again sign; capture third signature, and calculate and store features of third captured signature (block 706);

(4) Compare first signature with second and third signatures to determine if the first signature is compatible (e.g., based on statistically acceptable deviations) with the second and third signatures (decision block 708);

(5) If the first signature is incompatible with the second and third signatures, discard the first signature, ask the customer to again sign; capture the new signature and calculate and store features of the third captured signature; and try the test of decision block 708 again (block 710 after "no" exit of decision block 708);

(6) Continue performing blocks 708, 710 until "yes" exit to decision block 708 or give up after three failed attempts, initialize all data (block 730) and repeat the process from block 702 (decision block 712);

(7) Perform similar processes (blocks 714, 716, 718) to ensure compatibility between the second signature and the other two signatures;

(8) Perform similar processes (blocks 720, 722, 724) to ensure compatibility between the third signature and the other two signatures;

(9) Formulate template based on the three signatures now determined to be compatible each with the other two;

(10) Write template plus captured enrollment signature image and other customer identifying and authentication information (e.g., account number, device authentication keys and customer personal identification number) to host computer and/or to card 66 (block 726).

In the FIG. 9 point of transaction example, once an initialized IC card 66 is coupled to the signature device 64, microprocessor 200 first authenticates IC card 66 by reading device authentication keys from the protected storage area 258 maintained by the card and by, for example, decrypting the read information using a public key cryptosystem such as RSA to authenticate the identification information stored on the card. More specifically, this device authentication process (block 502) may be performed, for example, by reading a value stored on IC card 66 that has previously been encrypted using the private key of the card issuer. Microprocessor 200 may decrypt the value using the card issuer's corresponding public key stored on the card. Microprocessor 200 may then compare the decrypted value with the corresponding value in clear form stored by signature device 64, IC card 66 and/or calculated by microprocessor 200 (e.g, based on a "hash" value generated from information stored within the IC card 66). Microprocessor 200 halts the entire operation if the IC card 66 is found to be in inauthentic.

Assuming the memory card 56 passes the authenticity test, microprocessor 200 may read the signature image stored by the card 66 and may also read the biometric template stored within the card's non-volatile read/write memory 254 (see FIG. 6). As will be understood, the template is different from the enrollment signature image in that the template may include extracted signature features used for signature authentication purposes whereas the image is in this example the complete signature image. Once the template has been authenticated (block 504) (e.g., based on an embedded code), signature verification can then proceed.

In this example, microprocessor 200 may next extract appropriate features from the newly generated signature (block 508)—this signature being captured by blocks 300, 306 as described above in connection with FIG. 7. Microprocessor 200 then, under software control, compares the signature features extracted by block 508 with the authenticated template features (feature comparison process block 510) and generates a "score" value. This score (which indicates how closely the new signature matches the signature indicated by the template) is rated against a threshold value provided by the control parameter store 302. If the comparison score is within statistical limits, the new signature is accepted and the signature is verified as being "true." On the other hand, if the comparison score is higher than the threshold, the new signature is rejected and an associated failure indication is generated.

In this example, accepting the customer's signature initiates a process of generating an updated template for further signature verifications (block 512). The original template information provided by IC card 66 is modified based on the feature comparison process 510 to create an updated template which is then stored in place of the originally provided template on IC card 66. Such template updating is, of course, performed in this example only if the new signature is accepted—no template updating occurs upon signature rejection.

Template updating has the advantage of allowing IC card 66 to adapt to and learn from the signature capture process every time the customer signs using signature device 64. For example, the template becomes more and more precisely indicative of the customer's signature as time goes by and more and more repetitions of the customer's signature are figured into the template. As described above, at time of card issuance it would be inconvenient or impractical to require the customer to sign tens or hundreds of times—and moreover, the customer's hand would become tired and his or her handwriting would suffer accordingly. The template updating process as shown in FIG. 9 allows the template used for signature verification to be generated over time without any additional customer inconvenience by adapting the template each time the customer signs a receipt as part of a normal financial transaction. Moreover, the template adaptation process can be performed at a variety of different locations depending on where the customer presents card 66 to perform a transaction.

The template updating process shown in FIG. 9 has the additional advantage of adapting the customer's template to handwriting changes over time. It is relatively common for a person's handwriting to change gradually as time passes. For example, medical and law students may become lazier in their handwriting as the demands of their education require them to take lots of notes. Since the handwriting changes usually occur relatively gradually over time, they usually will not cause signature device 64 to reject so long as the customer engages in signature based transactions on a relatively frequent basis. The FIG. 9 example will thus adapt to gradual changes in a customer's signature while still ensuring that a forger can not successfully forge the signature.

Although the process shown in FIG. 9 has been explained in connection with IC card 66, the template authentication and updating process shown there can also be used independently of IC card 66 by authenticating and updating a signature template provided, for example, by a signature verification information provider 68 from a database as described above.

Other Signature Device Configurations

Figure 10:
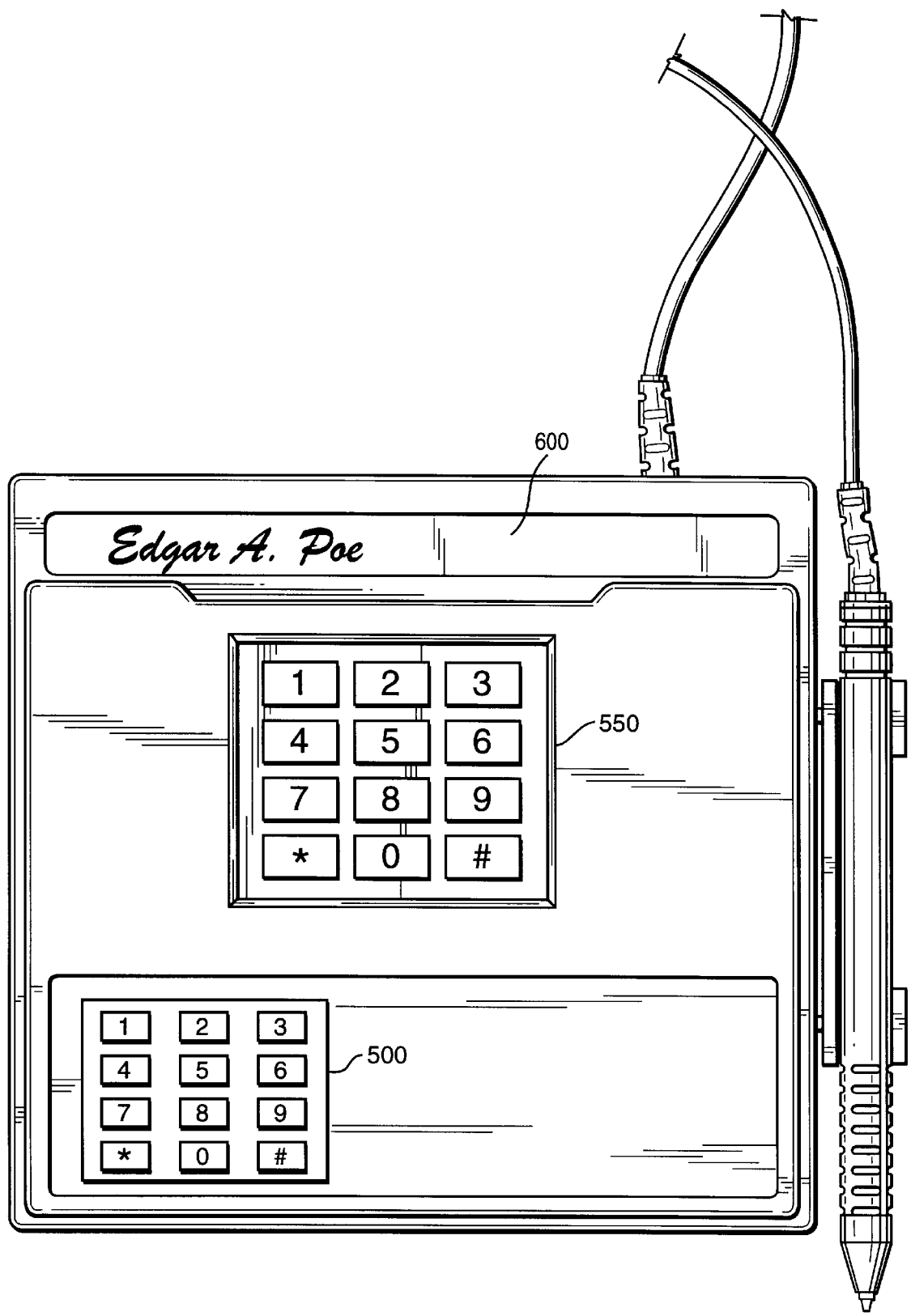
FIG. 10 shows an example signature device with alphanumeric input means and/or graphical display means.

FIG. 10 shows additional configurations for signature device 64 including:

mounting an alphanumeric or numeric keypad 500 on the front of housing 70 to allow a user to input his PIN for verification against a PIN stored in IC card 66 for example;

an image of a keypad 550 disposed on writing area 114 (or on a plastic or other member that can be inserted onto the writing surface 114 as needed) to allow a customer to select "buttons" using the electromagnetic stylus detection techniques provided by device 64; and/or a graphical LCD display 600 for displaying a captured signature.

Although signature device 64 has been described herein as being installed at a point of sale such as a retailer, its use is by no means so limited. To the contrary, signature device 64 can be used for a wide variety of different applications such as, for example:

security check points in a secure facility; upon issuance of security or ID documents such as drivers licenses, passports, etc.;

for other financial transactions (e.g., banks and other financial institutions);

to evidence legal transactions such as contracts; and under any other circumstance in which a handwritten signature is useful or desirable.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A signature capture and verification device for coupling to a portable IC card carried by a cardholder, the portable IC card including at least one electronic storage element, the signature capture and verification device comprising:

a housing defining a writing surface thereon;

a detecting circuit disposed within the housing for detecting position coordinates of a writing stylus during signing of a signature without requiring continual contact between the writing stylus and the writing surface;

a processor connected to the detecting circuit, the processor providing automatic signature verification based on the detected position coordinates and at least one signature template stored in the electronic storage element; and a coupling mechanism integrated with the housing, said coupling mechanism for connecting the processor to the electronic storage element, the coupling mechanism allowing the processor to read and write to the electronic storage element, wherein said processor collects signature signing data during at least some times when the stylus is not in contact with the writing surface.

2. A device as in claim 1 wherein the processor performs the functions of:

(a) receiving signature template information stored within the IC card electronic storage element;

(b) comparing at least one aspect of the received detected position coordinates with the received signature template information; and (c) generating a verification indication based on the comparison.

3. A device as in claim 1 wherein the writing surface defines an x, y coordinate system, and the processor performs the function of angle correcting the detected position coordinates based upon a line of linear regression minimizing the sum of squares of vertical or horizontal distance between the position coordinates and the line of regression, said angle correcting allowing digital signature capture for a range of different signature orientations at arbitrary angles relative to the x, y coordinate system of said writing surface.

4. A device as in claim 1 wherein the writing surface defines an x, y coordinate system, and the processor performs the function of angle correcting the detected position coordinates by minimizing the sum of squares of perpendicular distances between the position coordinates and a line of regression, said angle correcting allowing digital signature capture for a range of different signature orientations at arbitrary angles relative to the x, y coordinate system of said writing surface.

5. A device as in claim 1 further including means coupled to the processor for wirelessly communicating data to a host.

6. A device as in claim 1 wherein the detecting circuit includes a digitizer located beneath and spaced apart from the writing surface, and circuitry coupled to the digitizer for locating the position of the stylus device moving on the surface or on a record member located on the surface.

7. A device as in claim 1 further including means for locating the record member on the writing surface such that the plane of a record member coincides with that of the x,y plane of the detecting circuit during the writing of the signature.

8. A device as in claim 1 further including means for enabling a record member to be inserted easily into position onto the writing surface from the top or from the side and to avoid the member moving on the surface when the signature is written with the stylus device.

9. A device as in claim 1 wherein the stylus device is coupled electrically by a cable to the detecting circuit.

10. A device as in claim 9 wherein the stylus device delivers ink to a writing medium.

11. A device as in claim 9 wherein the stylus device comprises a non-ink cartridge to write "invisibly" directly on the writing surface.

12. A device as in claim 1 wherein the coupling mechanism includes an integrated IC (smart) card connector controlled by the processor such that data including an electronic signature image may be read from and/or written to an intelligent or memory based IC card.

13. A device as in claim 1 further including means for two-way communication with a host device so that a signature captured electronically may be compared with that stored on the IC card or at the host device and may be communicated to the host together with the result of the signature comparison for display, storage, onward transmission or hard copy reproduction.

14. A device as in claim 1 wherein the processor performs the function of comparing a submitted signature against a signature verification template supplied from the host or from the IC card based upon the extraction of a number of mathematically defined features.

15. A device as in claim 1 wherein the processor performs the function of authenticating a verification template against tampering by means of writing a template authentication code into the signature verification template at creation and update and by checking the authentication code when the template is communicated thereto.

16. A device as in claim 1 wherein the processor performs the function of conditionally updating a verification template so that the template molds itself to the author if the signature changes gradually over time.

17. A device as in claim 1 wherein the processor performs the function of enrolling new authors through checking for compatibility of a minimum of three initial signatures.

18. A device as in claim 1 wherein the device further includes a communications port, and the processor performs the function of automatically detecting the host communications protocol and adapting the communications port accordingly.

19. A device as in claim 1 including means for operating wirelessly allowing portability from one location to another.

20. A device as in claim 1 wherein the processor includes means for determining the angle of submission of the signature and correcting for said angle before signature comparison to provide digital signature capture for a range of different signature orientations at arbitrary angles relative to the x, y coordinate system of said writing surface.

21. A device as in claim 1 wherein the processor includes means for calculating the angle of submission which minimizes the sum of squared errors perpendicular to the line of regression through iterative solution of a cubic to allow digital signature capture for a range of different signature orientations at arbitrary angles relative to the x, y coordinate system of said writing surface.

22. A device as in claim 1 wherein the processor includes a data compressor that compresses a captured signature by iteratively reducing the number of points defining the signature until said digital signature is compressed down to a predetermined target size.

23. A device as in claim 1 wherein the processor includes means for encrypting the captured signature using a transaction based number communicated to the device from the host prior to communicating the signature back to the host.

24. A device as in claim 1 wherein the processor includes means for decrypting the signature when supplied with the encrypted signature and the original transaction based number from an attached host.

25. A device as in claim 1 further including a PIN pad allowing PIN based cardholder authentication to take place supporting DUKPT (derived unique key per transaction) and Master Session key management.

26. A device as in claim 1 further including an integrated LCD display coupled to the processor allowing the electronically captured signature to be displayed on said LCD.

27. A device as in claim 1 wherein the processor includes means for authenticating the validity of an IC card by utilizing public key encryption, using the IC card's public key to decrypt a message encrypted by the private key from the card.

28. A device as in claim 1 further including means for storing customization parameters characterizing the operation of signature capture, signature verification, signature compression and signature encryption.

29. A signature capture device as in claim 1 wherein the detecting circuit is at least one of (a) electrically and (b) electromagnetically coupled to the writing stylus.

30. A device as in claim 1 wherein said indicia includes signature image representing data stored in the IC card electronic storage element, and said device includes an electronic display connected to at least the processor, the electronic display rendering an image of the cardholder's signature based on the signature image representing data stored in the IC card electronic storage element.

31. A device as in claim 30 wherein the display also renders an image of the cardholder's signature based on the detected position coordinates.

32. A device as in claim 1 wherein the processor compresses the detected position coordinates.

33. In a signature verification system of the type including a housing having a writing surface and an integrated portable IC card coupler, a method of verifying a signature comprising:

(a) accessing at least one digital electronic storage element within or coupled to said housing;

(b) reading at least one signature template stored in digital form in the electronic storage element;

(c) acquiring a signature on the writing surface using a writing stylus;

(d) during step (c), detecting position coordinates of said writing stylus relative to the writing surface, including collecting signature signing data during at least some times when the stylus is not in contact with the writing surface;

(e) automatically verifying said signature made by step (c) based on the detected position coordinates and said signature template read from said electronic storage element;

(f) reading digital data representing a visual signature image stored in the electronic storage element in digital form in addition to said template; and (g) rendering, for purposes of visual comparison, an image of the cardholder's signature based on said visual signature image representing digital data.

34. A method as in claim 33 further including transforming said detected signature position coordinates relative to a determined line of regression to allow digital signature capture for a range of different signature orientations at arbitrary angles relative to the x, y coordinate system of said writing surface.

35. A method as in claim 33 further including applying an angle correction technique to said detected position coordinates based on solving a cubic expression to provide digital signature capture for a range of different signature orientations at arbitrary angles relative to the x, y coordinate system of said writing surface.

36. A method as in claim 35 further including determining a regression line defined by m=tanα such that the sum of square e=Σ(AiBi)² is minimized, where Ai is a detected position coordinate and Bi is a point defined by projecting the detected position coordinate perpendicular onto a line of regression constructed based at least in part on the detected position coordinates.

37. A method as in claim 33 further including compressing the detected position coordinates by iteratively reducing the number of points defining the signature until said digital signature is compressed down to a predetermined target size.

38. A method as in claim 33 further including displaying a signature image base on the detected position coordinates.

* * * * *